United States Patent
Fan et al.

(10) Patent No.: US 12,134,560 B2
(45) Date of Patent: Nov. 5, 2024

(54) SYSTEMS, METHODS AND MATERIALS FOR STABLE PHASE SYNGAS GENERATION

(71) Applicant: OHIO STATE INNOVATION FOUNDATION, Columbus, OH (US)

(72) Inventors: Liang-Shih Fan, Columbus, OH (US); Deven Baser, Columbus, OH (US); Andrew Tong, Columbus, OH (US); Sourabh G. Nadgouda, Columbus, OH (US); Fanhe Kong, Columbus, OH (US); Zhuo Cheng, Columbus, OH (US); Mandar Kathe, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 690 days.

(21) Appl. No.: 17/420,447

(22) PCT Filed: Jan. 16, 2020

(86) PCT No.: PCT/US2020/013823
§ 371 (c)(1),
(2) Date: Jul. 2, 2021

(87) PCT Pub. No.: WO2020/150438
PCT Pub. Date: Jul. 23, 2020

(65) Prior Publication Data
US 2022/0089438 A1  Mar. 24, 2022

Related U.S. Application Data

(60) Provisional application No. 62/793,708, filed on Jan. 17, 2019.

(51) Int. Cl.
*C01B 3/40* (2006.01)

(52) U.S. Cl.
CPC ........ *C01B 3/40* (2013.01); *C01B 2203/0233* (2013.01); *C01B 2203/0238* (2013.01);
(Continued)

(58) Field of Classification Search
CPC .............. C01B 3/40; C01B 2203/0233; C01B 2203/0238; C01B 2203/0261;
(Continued)

(56) References Cited

U.S. PATENT DOCUMENTS

| 971,206 A | 9/1910 | Messerschmitt |
| 1,078,686 A | 11/1913 | Lane |

(Continued)

FOREIGN PATENT DOCUMENTS

| CN | 1329761 A | 1/2001 |
| CN | 1325319 A | 12/2001 |

(Continued)

OTHER PUBLICATIONS

Kang et al. "Chemical looping partial oxidation of methane with CO2 utilization on the ceria-enhanced mesoporous Fe2O3 oxygen carrier," Fuel, 2018, 215: 787-798.

(Continued)

*Primary Examiner* — Andrew J. Oyer
(74) *Attorney, Agent, or Firm* — Michael Best & Friedrich LLP

(57) ABSTRACT

Systems and methods generally involve processing a gaseous reducing agent and a gaseous reforming agent to produce syngas in the presence of a stable-phase change metal-oxide based oxygen carrier. During operation, an oxygen content is measured for a reactor input stream and a reactor output stream. A percent oxygen depletion of the metal oxide is determined using an initial oxygen content of the metal oxide, the oxygen content of the input stream, and the oxygen content of the output stream. Based on the (Continued)

percent oxygen depletion, a mole ratio of reducing gas to oxidant in the input stream may be adjusted accordingly.

22 Claims, 9 Drawing Sheets

(52) U.S. Cl.
CPC ............... *C01B 2203/0261* (2013.01); *C01B 2203/1047* (2013.01); *C01B 2203/1241* (2013.01); *C01B 2203/1614* (2013.01); *C01B 2203/1628* (2013.01); *C01B 2203/169* (2013.01)

(58) Field of Classification Search
CPC .... C01B 2203/1047; C01B 2203/1241; C01B 2203/1614; C01B 2203/1628; C01B 2203/169; C01B 2203/1676; C01B 3/344; B01J 8/065; B01J 8/0278; B01J 2208/00628; B01J 2208/00964; B01J 2208/00973; B01J 2219/00186; B01J 2219/00198; B01J 2219/00202; B01J 2219/00207; B01J 2219/00231; B01J 2219/00247; B01J 19/0026

See application file for complete search history.

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,382,033 A | 5/1968 | Kitagawa |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,801,661 A | 4/1974 | Hart et al. |
| 3,879,514 A | 4/1975 | Dahl |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,151,124 A | 4/1979 | Gidaspow et al. |
| 4,155,832 A | 5/1979 | Cox et al. |
| 4,160,663 A | 7/1979 | Hsieh |
| 4,212,452 A | 7/1980 | Hsieh |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,375,983 A | 3/1983 | Celada et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 4,957,523 A | 9/1990 | Zarate et al. |
| 5,112,590 A | 5/1992 | Krishnamurthy et al. |
| 5,130,106 A | 7/1992 | Koves et al. |
| 5,365,560 A | 11/1994 | Tam |
| 5,447,024 A | 9/1995 | Ishida et al. |
| 5,456,807 A | 10/1995 | Wachsman |
| 5,509,362 A | 4/1996 | Lyon |
| 5,518,187 A | 5/1996 | Bruno et al. |
| 5,529,599 A | 6/1996 | Calderon |
| 5,545,251 A | 8/1996 | Knop |
| 5,584,615 A | 12/1996 | Micklich |
| 5,630,368 A | 5/1997 | Wagoner |
| 5,730,763 A | 3/1998 | Manulescu et al. |
| 5,762,681 A | 6/1998 | Lee et al. |
| 5,770,310 A | 6/1998 | Nogochi et al. |
| 5,827,496 A | 10/1998 | Lyon |
| 5,858,210 A | 1/1999 | Richardson |
| 5,965,098 A | 10/1999 | Boegner et al. |
| 6,007,699 A | 12/1999 | Cole |
| 6,030,589 A | 2/2000 | Hartweg et al. |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,506,351 B1 | 1/2003 | Jain et al. |
| 6,509,000 B1 | 1/2003 | Choudhary et al. |
| 6,517,631 B2 | 2/2003 | Bland |
| 6,607,704 B2 | 8/2003 | Guttridge et al. |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,067,456 B2 | 2/2006 | Fan et al. |
| 7,244,399 B2 | 7/2007 | Myohanen et al. |
| 7,404,942 B2 | 7/2008 | Sanfilippo et al. |
| 7,496,450 B2 | 2/2009 | Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,601,958 B2 | 12/2013 | Salatino et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 8,877,150 B1 | 11/2014 | Fan et al. |
| 9,017,627 B2 | 4/2015 | Gupta |

(56) References Cited

U.S. PATENT DOCUMENTS

| | | |
|---|---|---|
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |
| 9,616,403 B2 | 4/2017 | Fan et al. |
| 9,777,920 B2 | 10/2017 | Fan et al. |
| 9,790,605 B2 | 10/2017 | Sheehan et al. |
| 9,874,347 B1 | 1/2018 | Uddin et al. |
| 9,903,584 B2 | 2/2018 | Fan et al. |
| 10,010,847 B2 | 7/2018 | Fan et al. |
| 10,081,772 B2 | 9/2018 | Fan et al. |
| 10,144,640 B2 | 12/2018 | Fan et al. |
| 10,501,318 B2 | 12/2019 | Fan et al. |
| 10,865,346 B2 | 12/2020 | Fan et al. |
| 11,111,143 B2 | 9/2021 | Fan et al. |
| 2001/0055559 A1 | 12/2001 | Sanfilippo et al. |
| 2002/0011428 A1 | 1/2002 | Scheuerman |
| 2002/0059864 A1 | 5/2002 | Janssen et al. |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0124041 A1 | 7/2003 | Neumann et al. |
| 2003/0130360 A1 | 7/2003 | Kindig et al. |
| 2003/0153632 A1 | 8/2003 | Wang et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0092784 A1 | 5/2004 | Legendre |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0117714 A1 | 5/2007 | Geyer et al. |
| 2007/0157517 A1 | 7/2007 | Tsay et al. |
| 2007/0240407 A1 | 10/2007 | Ruth et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0119419 A1 | 5/2010 | Sprouse et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0138788 A1 | 6/2011 | Kanda et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0071314 A1 | 3/2013 | Gupta |
| 2013/0085365 A1 | 4/2013 | Marashdeh et al. |
| 2013/0125462 A1 | 5/2013 | Greiner et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0021028 A1 | 1/2014 | Paganessi et al. |
| 2014/0144082 A1 | 5/2014 | Fan et al. |
| 2014/0275297 A1 | 9/2014 | Velazquez-Vargas et al. |
| 2015/0238915 A1 | 8/2015 | Fan et al. |
| 2015/0343416 A1 | 12/2015 | Fadhel et al. |
| 2016/0002034 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0268616 A1 | 9/2016 | Fan et al. |
| 2017/0015554 A1 | 1/2017 | Siengchum et al. |
| 2018/0296978 A1 | 10/2018 | Peck et al. |
| 2018/0353933 A1 | 12/2018 | Wendland et al. |
| 2019/0003704 A1 | 1/2019 | Aranda et al. |
| 2019/0152778 A1 | 5/2019 | Fan et al. |
| 2019/0232220 A1 | 8/2019 | Fan et al. |
| 2020/0156032 A1 | 5/2020 | Fan et al. |

FOREIGN PATENT DOCUMENTS

| | | |
|---|---|---|
| CN | 1454711 A | 11/2003 |
| CN | 1501534 A | 6/2004 |
| CN | 101389734 A | 3/2009 |
| CN | 101426885 A | 5/2009 |
| CN | 102187153 A | 9/2011 |
| CN | 102388005 A | 3/2012 |
| CN | 102612625 A | 7/2012 |
| CN | 102639213 A | 8/2012 |
| CN | 102686301 A | 9/2012 |
| CN | 103468322 A | 12/2013 |
| DE | 102010028816 A1 | 11/2011 |
| EP | 0161970 A1 | 11/1985 |
| EP | 1134187 A2 | 9/2001 |
| EP | 1445018 A1 | 8/2004 |
| EP | 1580162 A2 | 9/2005 |
| EP | 1845579 A2 | 10/2007 |
| EP | 1933087 A2 | 6/2008 |
| EP | 2279785 A2 | 2/2011 |
| EP | 2441816 A1 | 4/2012 |
| EP | 2450420 A1 | 5/2012 |
| EP | 2495030 A2 | 9/2012 |
| EP | 2515038 A1 | 10/2012 |
| EP | 2601443 A0 | 6/2013 |
| EP | 1976633 B1 | 3/2014 |
| FR | 2924035 A1 | 5/2009 |
| JP | H03-68898 A | 3/1991 |
| JP | H10249153 A | 9/1998 |
| JP | 2006-502957 A | 1/2006 |
| KR | 20060096609 A | 9/2006 |
| KR | 101364823 B1 | 2/2014 |
| TW | 406055 B | 9/2000 |
| TW | 426728 B | 3/2001 |
| WO | WO1990/013773 A1 | 11/1990 |
| WO | WO1999/065097 A1 | 12/1999 |
| WO | WO2000/022690 A1 | 4/2000 |
| WO | WO2000/068339 A1 | 11/2000 |

(56) References Cited

FOREIGN PATENT DOCUMENTS

| WO | WO2001/042132 A1 | 6/2001 |
| --- | --- | --- |
| WO | WO2003/070629 A1 | 8/2003 |
| WO | 2005/066468 A2 | 7/2005 |
| WO | WO2007/082089 A2 | 7/2007 |
| WO | WO2007/122498 A2 | 11/2007 |
| WO | WO2007/134075 A2 | 11/2007 |
| WO | WO2008/019079 A2 | 2/2008 |
| WO | WO2008/071215 A1 | 6/2008 |
| WO | WO2008/082312 A1 | 7/2008 |
| WO | WO2008/115076 A2 | 9/2008 |
| WO | WO2009/007200 A2 | 1/2009 |
| WO | WO2009/008565 A1 | 1/2009 |
| WO | WO2009/009388 A2 | 1/2009 |
| WO | WO2009/021258 A1 | 2/2009 |
| WO | WO2009/023515 A2 | 2/2009 |
| WO | WO2009/114309 A2 | 9/2009 |
| WO | WO2010/037011 A2 | 4/2010 |
| WO | WO2010/063923 A2 | 6/2010 |
| WO | WO2010/126617 A1 | 11/2010 |
| WO | WO2011/021161 A2 | 2/2011 |
| WO | WO2011/031752 A2 | 3/2011 |
| WO | WO2011/031755 A1 | 3/2011 |
| WO | WO2011/084734 A2 | 7/2011 |
| WO | WO2012/064712 A1 | 5/2012 |
| WO | WO2012/077978 A2 | 6/2012 |
| WO | WO2012/144899 A1 | 10/2012 |
| WO | WO2012/155054 A1 | 11/2012 |
| WO | WO2012/155059 A1 | 11/2012 |
| WO | WO2013/040645 A1 | 3/2013 |
| WO | WO2014/085243 A1 | 6/2014 |
| WO | WO2014/091024 A1 | 6/2014 |
| WO | WO2014/152814 A1 | 9/2014 |
| WO | WO2011/153568 A1 | 12/2014 |
| WO | WO2014/195904 A1 | 12/2014 |
| WO | 2015/016956 A1 | 2/2015 |
| WO | WO2016/053941 A1 | 4/2016 |
| WO | WO2017/162427 A1 | 9/2017 |
| WO | 2020/175426 A1 | 9/2020 |
| WO | WO2020/210865 A1 | 10/2020 |
| WO | 2021/162751 A1 | 8/2021 |

OTHER PUBLICATIONS

European Patent Office Extended Search Report for Application No. 20741337.8 dated Jul. 22, 2022 (9 pages).
International Search Report and Written Opinion for Application No. PCT/US2021/060744 dated Mar. 18, 2022 (18 pages).
India Patent Office Examination Report for Application No. 202117034155 dated Nov. 21, 2022 (5 pages).
Heliogen, "Heliogen, Replacing fuels with sunlight," <https://heliogen.com/> Accessed Aug. 26, 2020.
Hsieh et al., "250 kWth high pressure pilot demonstration of the syngas chemical looping system for high purity H2 production with CO2 capture," Applied energy, 2018, 230: 1660-1672.
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of CU-, Ni-, and Fe-Based Oxygen Carriers Using Syngas (CO + H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Abdallah et al., "Comparison of mesoporous silicate supports for the immobilisation and activity of cytochrome c and lipase," J. Mol. Catal. B: Enzym., 2014, 108, 82-88.
Adanez et al., "Progress in Chemical-Looping Combustion and Reforming technologies," Progress in Energy and Combustion Science, 2012, vol. 38, Issue 2, pp. 215-282.
Adanez et al., "Selection of oxygen carriers for chemical-looping combustion," Energy & Fuels, American Chemical Society, 2004, vol. 18, No. 2, pp. 371-377.

Ahern et al., "Comparison of fenofibratemesoporous silica drug-loading processes for enhanced drug delivery," Eur. J. Pharm. Sci., 2013, 50, 400-409.
Alalwan et al., "Co3O4 nanoparticles as oxygen carriers for chemical looping combustion: A materials characterization approach to understanding oxygen carrier performance," Chemical Engineering Journal, 2017, 319, 279-287.
Alalwan et al., "α-Fe2O3 Nanoparticles as Oxygen Carriers for Chemical Looping Combustion: An Integrated Materials Characterization Approach to Understanding Oxygen Carrier Performance, Reduction Mechanism, and Particle Size Effects," Energy Fuels, 2018, 32, 7959-7970.
Anisimov et al., "Density-functional calculation of effective Coulomb interactions in metals," Phys. Rev. B, 1991, 43, 7570.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Barreca et al., "Methanolysis of styrene oxide catalysed by a highly efficient zirconium-doped mesoporous silica," Appl. Catal. A, 2006, 304, 14-20.
Bell et al., "H2 Production via Ammonia Decomposition Using Non-Noble Metal Catalysts: A Review," Top Catal, 2016, 59, 1438-1457.
Burke et al., "Large pore bi-functionalised mesoporous silica for metal ion pollution treatment," J. Hazard. Mater., 2009, 164, 229-234.
Cao et al., "Investigation of Chemical Looping Combustion by Solid Fuels. 1. Process Analysis," Energy Fuels, 2006, 20(5), pp. 1836-1844.
Carrero et al., "A critical literature review of the kinetics for the oxidative dehydrogenation of propane over well-defined supported vanadium oxide catalysts," ACS Catalysis, 2014, 4: 3357-3380.
Cavani et al., "Oxidative dehydrogenation of ethane and propane: How far from commercial implementation?" Catalysis Today, 2007, 127(1): 113-131.
Cheng et al., "Carbon Dioxide Adsorption and Activation on Ceria (110): A density functional theory study," J. Chem. Phys. 2013, 138, 014702.
Cheng et al., "Methane Adsorption and Dissociation on Iron Oxide Oxygen Carrier: Role of Oxygen Vacancy," Phys. Chem. Chem. Phys. 2016, 18, 16423-16435.
Cheng et al., "Oxygen vacancy promoted methane partial oxidation over iron oxide oxygen carrier in chemical looping process," Phys. Chem. Chem. Phys., 2016, 18, 32418-32428.
Cheng et al., "Propagation of Olefin Metathesis to Propene on WO3 Catalysts: A Mechanistic and Kinetic Study," ACS Catal. 2015, 5, 59-72.
Cho et al., "Comparison of iron-, nickel-, copper- and manganese-based oxygen carriers for chemical-looping combustion," Fuel, 2004, vol. 83, Issue 9, pp. 1215-1225.
Chung et al., "Chemically and physically robust, commercially-viable iron-based composite oxygen carriers sustainable over 3000 redox cycles at high temperatures for chemical looping applications," Energy Environ. Sci., 2017, 10, 2318-2323.
Coleman et al., "Synthesis and characterization of dimensionally ordered semiconductor nanowires within mesoporous silica," J. Am. Chem. Soc., 2001, 123, 7010-7016.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18 (2012), pp. 1274-1281.
De Diego et al., "Development of Cu-based oxygen carriers for chemical-looping combustion," Fuel, 2004, vol. 83, Issue 13, pp. 1749-1757.
De Klerk, "Gas-to-Liquid Conversion." Natural Gas Conversion Technologies Workshop of ARPA-E. U.S. Department of Energy, Houston, TX. vol. 13 (2012).

(56) References Cited

OTHER PUBLICATIONS

Delaney et al., "Development of chemically engineered porous metal oxides for phosphate removal," J. Hazard. Mater., 2011, 185, 382-391.
Delaney et al., "Porous silica spheres as indoor air pollutant scavengers," J. Environ. Monit., 2010, 12, 2244-2251.
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Faezad Othman et al., "Utilization of Low-Grade Iron Ore in Ammonia Decomposition," Procedia Chemistry, 2016, 19:119-124.
Faezad Othman et al., "Utilization of Malaysian Low Grade Iron Ore as Medium for Ammonia Decomposition," ARPN Journal of Engineering and Applied Sciences, 2015, 10(22):17286-17288.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Flynn et al., "Pervaporation performance enhancement through the incorporation of mesoporous silica spheres into PVA membranes," Sep. Purif. Technol., 2013, 118, 73-80.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Forzatti, "Present status and perspectives in de-NOx SCR catalysis." Appl. Catal. A: Gen., 222(1-2), 2001, 221-236.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Ghoneim et al., "Review on innovative catalytic reforming of natural gas to syngas," World J. Eng. Technol. 2016, 4(1):116-139.

Go et al., "Hydrogen production from two-step steam methane reforming in a fluidized bed reactor," International Journal of Hydrogen Energy, 2009, vol. 34, p. 1301-1309.
Goellner et al., "Baseline analysis of crude methanol production from coal and natural gas," National Energy Technology Laboratory (NETL), US Department of Energy, 2014, 83 pages.
Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).
Grimme et al., "A consistent and accurate ab initio parametrization of density functional dispersion correction (DFT-D) for the 94 elements H—Pu," J. Chem. Phys., 2010, 132, 19.
Grimme et al., "Effect of the damping function in dispersion corrected density functional theory," J. Comput. Chem., 2011, 32, 1456-1465.
Haque, "Microwave energy for mineral treatment processes—a brief review," International Journal of Mineral Processing, vol. 57, pp. 1-24, 1999.
Henkelman et al., "A climbing image nudged elastic band method for finding saddle points and minimum energy paths," J. Chem. Phys., 2000, 113, 9901-9904.
Herbst et al., "Relativistic calculations of 4f excitation energies in the rare-earth metals: Further results," Phys. Rev. B, 1978, 17, 3089.
Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing LTD, vol. 10, pp. 717-725.
Huijgen et al., "Carbon dioxide sequestration by mineral carbonation," ECN-C—03-016, www.ecn.nl/docs/library/report/200e/c03016.pdf, Feb. 2003.
Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).
Imanaka et al., "Advances in Direct NOx Decomposition Catalysts," Appl. Catal. A: Gen., 431-432, 2012, 1-8.
Ishida et al., "Evaluation of a Chemical-Looping-Combustion Power-Generation System by Graphic Exergy Analysis," Energy, 12(2), 147-154 (1987).
Iwamoto et al., "Influence of sulfur dioxide on catalytic removal of nitric oxide over copper ion-exchanged ZSM-5 Zeolite." Appl. Catal., 69(2), 1991, 15-19.
Izquierdo et al., "Catalyst Deactivation and Regeneration Processes in Biogas Tri-Reforming Process. The Effect of Hydrogen Sulfide Addition," Catalysts, 2018, 8(12): 19 pages.
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of Co0-NiO," Energy & Fuels, 1998, vol. 12, 1272-1277.
Johansson et al., "Combustion of Syngas and Natural Gas in a 300 W Chemical-Looping Combustor," Chemical Engineering Research and Design vol. 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Modularization strategy for syngas generation in chemical ," AIChE Journal, 2017, 63(8):3343-3360.
Kathe et al., "Chemical Looping Gasification for Hydrogen Enhanced Syngas Production with in-situ CO2 Capture," United States Department of Energy, OSTI: 1185194, (2015).
Kiuchi et al., "Recovery of hydrogen from hydrogen sulfide with metals or metal sulfides," Int. J. Hydrogen Energy, 1982, 7: 477-482.

(56) References Cited

OTHER PUBLICATIONS

Koulialias et al., "Ordered defects in Fe 1-x S generate additional magnetic anisotropy symmetries," Journal of Applied Physics, 2018, 123(3): 033902, 10 pages.

Kresse et al., "Ab initio molecular dynamics for liquid metals," Phys. Rev. B, 1993, 47, 558.

Kresse et al., "Efficiency of ab-initio total energy calculations for metals and semiconductors using a plane-wave basis set," Comput. Mater. Sci., 1996, 6, 15-50.

Kresse et al., "Efficient iterative schemes for ab initio total-energy calculations using a plane-wave basis set," Phys. Rev. B, 1996, 54, 11169.

Kumar et al., "Direct air capture of CO2 by physisorbent materials," Angew. Chem., Int. Ed., 2015, 54, 14372-14377.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Clean coal conversion processes—progress and challenges," The Royal Society of Chemistry, Energy & Environmental Science, Jul. 30, 2008, vol. 1, pp. 248-267.

Li et al., "Ionic Diffusion in the Oxidation of Iron-effect of Support and Its Implications to Chemical Looping Applications," Energy Environ. Sci. 2011, 4, 876-880.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," Aiche Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Lin et al., "Novel Magnetically Separable Mesoporous Fe2O3@SBA-15 Nanocomposite with Fully Open Mesochannels for Protein Immobilization," Chemistry of Materials, 2008, vol. 20, pp. 6617-6622.

Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.

Liu et al., "Recent Advances in Catalytic DeNOx Science and Technology," Catalysis Reviews, 48(1), 2006, 43-89.

Lockwood Greene, "Ironmaking Process Alternative Screening Study, vol. I: Summary Report," Department of Energy United States of America, Oct. 2000, 153 pages.

Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Makepeace et. al., "Ammonia decomposition catalysis using non-stoichiometric lithium imide," Chem. Sci., 2015, 6, 3805.

Mamman et al., "Simultaneous steam and CO2 reforming of methane to syngas over NiO/MgO/SA-5205 in presence and absence of oxygen," Applied Catalysis A, 1998, vol. 168, p. 33-46.

Mao et al., "Facile synthesis of phase-pure $FeCr_2Se_4$ and $FeCr_2S_4$ nanocrystals via a wet chemistry method," J. Mater. Chem. C, 2014, 2: 3744-3749.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Masui et al., "Direct Decomposition of NO into N2 and O2 Over C-type Cubic Y2O3—Tb4O7—ZrO2," Materials Sciences and Applications, 3(10), 2012, 733-738.

Mattisson et al., "Application of chemical-looping combustion with capture of CO2," Second Nordic Minisymposium on Carbon Dioxide Capture and Storage, Goeteborg, Oct. 26, 2001, pp. 46-51.

Mattisson et al., "Chemical-looping combustion using syngas as fuel," International Journal of Greenhouse Gas control, 2007, vol. 1, Issue 2, pp. 158-169.

Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.

Mattisson et al., "The use of iron oxide as an oxygen carrier in chemical-looping combustion of methane with inherent separation of CO2," Fuel, 2001, vol. 80, pp. 1953-1962.

Mattisson et al., "Use of Ores and Industrial Products As Oxygen Carriers in Chemical-Looping Combustion," Energy & Fuels, 2009, vol. 23, pp. 2307-2315.

Mihai et al., "Chemical looping methane partial oxidation: The effect of the crystal size and O content of LaFeO3," Journal of Catalysis, 2012, 293:175-185.

Miller et al., "Toward Transformational Carbon Capture," AIChE Journal, 62, 1-10 (2016).

Moreira, "Steam Cracking: Kinetics and Feed Characterization," Dissertation, 2015, 10 pages.

NETL, National Energy Technology Laboratory. U.S. Department of Energy, "Quality Guidelines for Energy System Studies—Specification for Selected Feedstocks." Jan. 2012.

NETL, National Energy Technology Laboratory. U.S. Department of Energy, "Syngas Contaminant Removal and Conditioning," webpage accessed on Jul. 8, 2018.

Nipattummakul et al., "Hydrogen and syngas production from sewage sludge via steam gasification," Fuel and Energy Abstracts, 2010, 35 (21), 11738-11745.

Ockwig et al., "Membranes for Hydrogen Separation," American Chemical Society, Chem. Rev., Oct. 10, 2007, vol. 107, pp. 4078-4110.

O'Connor et al., "Carbon Dioxide Sequestration by Direct Mineral Carbonation: Results from Recent Studies and Currents Status," Abstract, USDOE Office of Fossil Energy, 2001.

Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).

Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.

OSHA, "Hydrogen Sulfide in Workplaces," <https://www.osha.gov/SLTC/hydrogensulfide/hydrogensulfide_found.html> webpage accessed Jul. 8, 2018.

Pans et al., "Optimization of H2 production with CO2 capture by steam reforming of methane integrated with a chemical-looping combustion system," International Journal of Hydrogen Energy, 2013, 38(27): 11878-11892.

Park et al., "CO2 Mineral Sequestration: Chemically Enhanced Aqueous Carbonation of Serpentine," The Canadian Journal of Chemical Engineering, 2003, vol. 81, pp. 885-890.

Park et al., "CO2 Mineral Sequestration: physically activated dissolution of serpentine and pH swing process," Chemical Engineering Science, 2004, vol. 59, pp. 5241-5247.

Perdew et al., "Generalized gradient approximation made simple," Phys. Rev. Lett., 1996, 77, 3865.

(56) References Cited

OTHER PUBLICATIONS

Pfeifer, "Industrial furnaces-status and research challenges," Energy Procedia, 2017, 120: 28-40.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Enhanced methane monversion in mhemical looping partial oxidation systems using a copper doping modification," Appl. Catal. B, 2018, 235, 143-149.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron-Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combustion," Journal of Materials Chemistry A, 2017, 8 pages.
Rollmann et al., "First-principles calculation of the structure and magnetic phases of hematite," Phys. Rev. B, 2004, 69, 165107.
Rostrup-Nielsen, "Syngas in Perspective," Catalysis Today, 2002, 71(3-4), 243-247.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Ryden et al., "Using steam reforming to produce hydrogen with carbon dioxide capture by chemical-looping combustion," International Journal of Hydrogen Energy, 2006, 31(10): 1271-1283.
Sassi et al., "Sulfur Recovery from Acid Gas Using the Claus Process and High Temperature Air Combustion ( HiTAC ) Technology," Am. J. Environ. Sci., 2008, 4, 502-511.
Sattler et al., "Catalytic Dehydrogenation of Light Alkanes on Metals and Metal Oxides," Chem Rev, 2014, 114(20): 10613-10653.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sheppard et al., "Paths to which the nudged elastic band converges," J. Comput. Chem., 2011, 32, 1769-1771.
Shick et al., "Single crystal growth of $CoCr_2S_4$ and $FeCr_2S_4$," Journal of Crystal Growth, 1969, 5(4): 313-314.
Speight, "Gasification processes for syngas and hydrogen production," Gasification for Synthetic Fuel Production, Woodhead Publishing, 2015, 119-146.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the $Fe_3O_4$/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Sun et al., "Review: Fundamentals and challenges of electrochemical CO2 reduction using two-dimensional materials," Chem, 2017, 3, 560-587.
Takanabe, "Catalytic Conversion of Methane: Carbon Dioxide Reforming and Oxidative Coupling," Journal of the Japan Petroleum Institute, 2012, 55, 1-12.
Thiollier et al., "Preparation and Catalytic Properties of Chromium-Containing Mixed Sulfides," Journal of Catalysis, 2011, 197(1): 58-67.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
U.S. Department of Energy, NCCTI Energy Technologies Group, Office of Fossil Energy, "CO2 Capture and Storage in Geologic Formations," p. 34, Revised Jan. 8, 2002.
United States Environmental Protection Agency. "Air Pollution Control Technology Fact Sheet: Selective Catalytic Reforming," <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., "Highly efficient metal sulfide catalysts for selective dehydrogenation of isobutane to isobutene," ACS Catalysis, 2014, 4: 1139-1143.
Wang et al., "Isobutane Dehydrogenation over Metal (Fe, Co, and Ni) Oxide and Sulfide Catalysts: Reactivity and Reaction Mechanism," ChemCatChem, Jul. 2014, vol. 6, pp. 2305-2314.
Wang et al., "Study of bimetallic interactions and promoter effects of FeZn, FeMn and FeCr Fischer-Tropsch synthesis catalysts," Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Xu et al., "A novel chemical looping partial oxidation process for thermochemical conversion of biomass to syngas," Applied Energy, 2018, 222:119-131.
Yamazaki et al., "Development of highly stable nickel catalyst for methane-steam reaction under low steam to carbon ratio," Applied Catalyst A, 1996, vol. 136, p. 49-56.
Yin et al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
Zeng et al., "Metal oxide redox chemistry for chemical looping processe," Nat Rev Chem., 2018, 2, 349-364.
International Search Report and Written Opinion for Application No. PCT/US2020/013823 dated Apr. 9, 2020 (16 pages).
International Search Report and Written Opinion for Application No. PCT/US2021/039622 dated Dec. 9, 2021 (17 pages).
Zhou et al., "Syngas chemical looping process: Dynamic modeling of a moving-bed reducer," AIChE Journal, 2013, 59(9): 3432-3443.

though the process requires auxiliary equipment, thus negatively affecting the overall economics of syngas generation.

SYSTEMS, METHODS AND MATERIALS FOR STABLE PHASE SYNGAS GENERATION

CROSS-REFERENCE TO RELATED APPLICATION(S)

The present application is a U.S. national stage entry of International Patent Application No. PCT/US2020/013823, filed on Jan. 16, 2020, which is related to and claims the priority benefit of U.S. Provisional Patent Application No. 62/793,708, filed on Jan. 17, 2019, the entire contents of each of which are fully incorporated herein by reference.

TECHNICAL FIELD

The present disclosure relates to systems and methods for syngas generation. More particularly, the present disclosure relates to systems and methods for syngas generation through phase change mediated partial oxidation of methane.

INTRODUCTION

Syngas, a mixture of CO and $H_2$, is a crucial precursor for various chemicals and liquid fuels. Conventional syngas generation is achieved through methane reforming with an oxidant over a catalyst. Typically, the oxidants used are molecular oxygen, steam or $CO_2$, where these can be used separately or as mixtures in a process.

Among syngas generation technologies, steam methane reforming (SMR) and autothermal reforming (ATR) are used for hydrogen production and liquid fuel production, respectively. Both systems employ a Ni-based catalyst, using one or more oxidants to control the $H_2$:CO ratio and methane conversion. ATR process utilizes $H_2O$ and $O_2$ for partial oxidation of methane, adjusting the ratios of the two oxidants to provide a $H_2$:CO ratio of ~2. However, this process requires auxiliary equipment, thus negatively affecting the overall economics of syngas generation.

Improving the economics of syngas generation from methane has tremendous implications towards liquid fuel and chemical production. Commercial gas-to-liquid plants employ air separation units (ASUs) to use molecular oxygen in conjunction with steam to partially oxidize $CH_4$ to CO and $H_2$. The catalyst, however, suffers from carbon deposition under lower oxidant concentrations, limiting the operating range of the process. Additionally, an ASU is energy and capital intensive which severely affects the overall economics for syngas generation.

SUMMARY

Generally, the instant disclosure relates to syngas production through stable phase change mediated partial oxidation of a reducing agent.

In one aspect, a method for operating a reactor system is disclosed. The example method includes providing an input stream to the reactor system, where the input stream includes a reducing gas stream and an oxidant stream, determining an initial oxygen content of a metal oxide in the reactor system, measuring an oxygen content of the input stream, measuring an oxygen content of an output stream from the reactor system, calculating a percent oxygen depletion of the metal oxide using the initial oxygen content of the metal oxide, the oxygen content of the input stream, and the oxygen content of the output stream, and, when the percent oxygen depletion of the metal oxide is above a predetermined threshold, adjusting a mole ratio of reducing gas to oxidant gas in the input stream.

In another aspect, another method for operating a reactor system is disclosed. The example method includes providing a first input stream to a first reactor assembly in the reactor system, where the first input stream including reducing gas and oxidant; determining an initial oxygen content of a first metal oxide in the first reactor assembly, measuring a first input stream oxygen content, measuring an oxygen content of an output of the first reactor assembly, calculating a percent oxygen depletion of the first metal oxide using the initial oxygen content of the first metal oxide, the first input stream oxygen content, and the oxygen content of the output of the first reactor assembly, when the percent oxygen depletion of the first metal oxide is above a first predetermined threshold, adjusting a mole ratio of reducing gas to oxidant in the first input stream, providing a second input stream to a second reactor assembly in the reactor system, the second input stream including reducing gas and oxidant, determining an initial oxygen content of a second metal oxide in the second reactor assembly, measuring a second input stream oxygen content, measuring an oxygen content of an output of the second reactor assembly, calculating a percent oxygen depletion of the second metal oxide using the initial oxygen content of the second metal oxide, the second input stream oxygen content, and the oxygen content of the output stream, and, when the percent oxygen depletion of the second metal oxide is above a second predetermined threshold, adjusting a mole ratio of reducing gas to oxidant in the second input stream.

There is no specific requirement that a material, technique or method relating to syngas generation include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
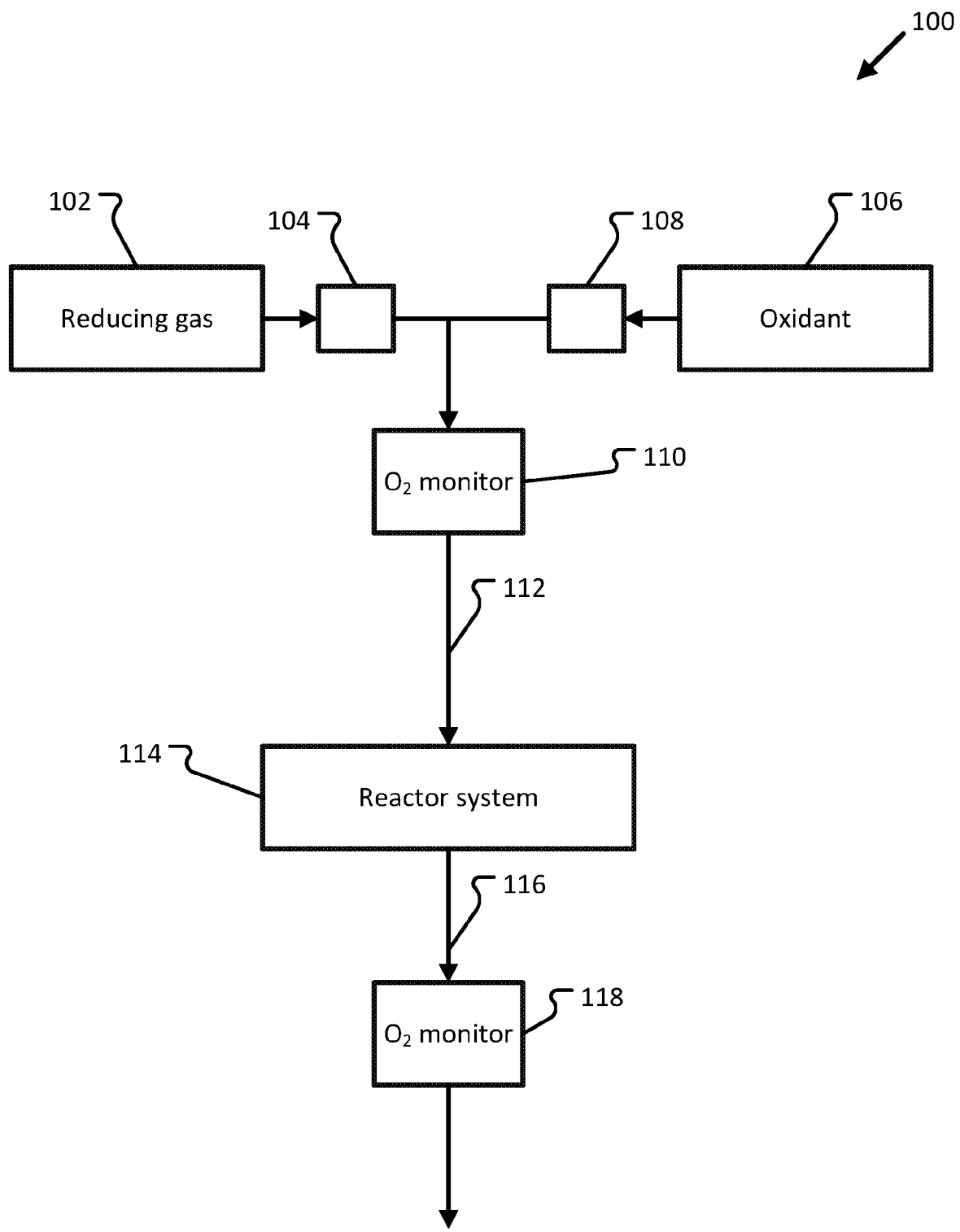
FIG. 1 is a schematic diagram of an example system for syngas generation.

Systems and methods disclosed and contemplated herein relate to syngas generation. Disclosed systems and methods employ stable solid metal oxide phases (termed "stable phase") during syngas generation, where the metal oxides participate in reactions associated with syngas generation. That is, using a stable phase can eliminate the use of molecular oxygen by efficiently transferring oxygen from reforming agents such as $H_2O$ and $CO_2$ to gaseous fuels such as $CH_4$ through stable solid metal oxide phases. The use of a solid phase assisted transfer inherently changes the thermodynamics of the overall system, allowing for higher syngas production efficiencies. This mediation of oxygen is driven by the thermodynamics of the gas-solid reactions and the kinetic rates of reduction and oxidation reactions of the solid metal oxide.

I. Example Reactions

Systems and methods disclosed and contemplated herein generally involve processing a gaseous reducing agent and a gaseous reforming agent to produce syngas in the presence of a stable-phase change metal-oxide based oxygen carrier. In some implementations, the gaseous reducing agent is methane and the gaseous reforming agent includes steam and/or $CO_2$, although other possibilities are contemplated. Example reaction stoichiometry is provided in Reaction I and Reaction II below, where M is a metal.

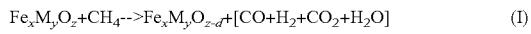

(I)

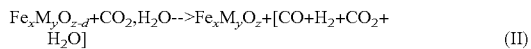

(II)

The gaseous reducing agent abstracts lattice oxygen from the metal-oxide oxygen carrier (as shown in Reaction I), while the oxidizing agents replenish the depleted oxygen (as shown in Reaction II). That is, $CH_4$ reacts with the metal oxide and abstracts the lattice oxygen to form complete combustion products ($CO_2$, $H_2O$) and partial combustion products (CO, $H_2$). The metal on the lattice surface acts as the catalytic active site for hydrogen (H) abstraction from $CH_4$. This creates oxygen vacancies on the surface of the metal oxide, which in-turn act as catalytic active sites for $CO_2$ or $H_2O$ reduction. The $CO_2$ and $H_2O$ thus oxidize the reduced metal oxide in the same reactor and form CO and $H_2$, respectively.

Under steady state condition, the oxygen abstraction from $CH_4$ and the oxygen donation from $CO_2/H_2O$ reach an equilibrium. This equilibrium directly affects the oxidation state of the metal oxide reacting and the gas phase composition. As a result, the metal oxide bed has a stratified oxidation state of the active metal where the net oxidation state of the metal oxide does not change with time. Thus, the overall reaction mimics the catalytic dry reforming or steam methane reforming process but the mechanism for $CH_4$ and $CO_2/H_2O$ gas-solid reactions follows a different path. This unique activation of $CH_4$ and $CO_2/H_2O$ with the metal oxide acting as the oxygen mediator adds additional degrees of freedom which helps in producing syngas efficiently.

The mediation of reaction I and II by lattice oxygen from the metal-oxides influences the thermodynamic composition of the syngas that is produced from this system. The variation of the thermodynamic composition because of mediation by the lattice oxygen from the metal-oxide carrier differentiates this system from gas-phase only chemistry. The variables that affect thermodynamic gas product composition for this system include, but are not limited to, the amount of lattice oxygen per amount of metal that participates in the reactions, the composition, crystalline structure and the solid phase of the metals, and the specific mixing and kinetic dynamics.

Figure 8:
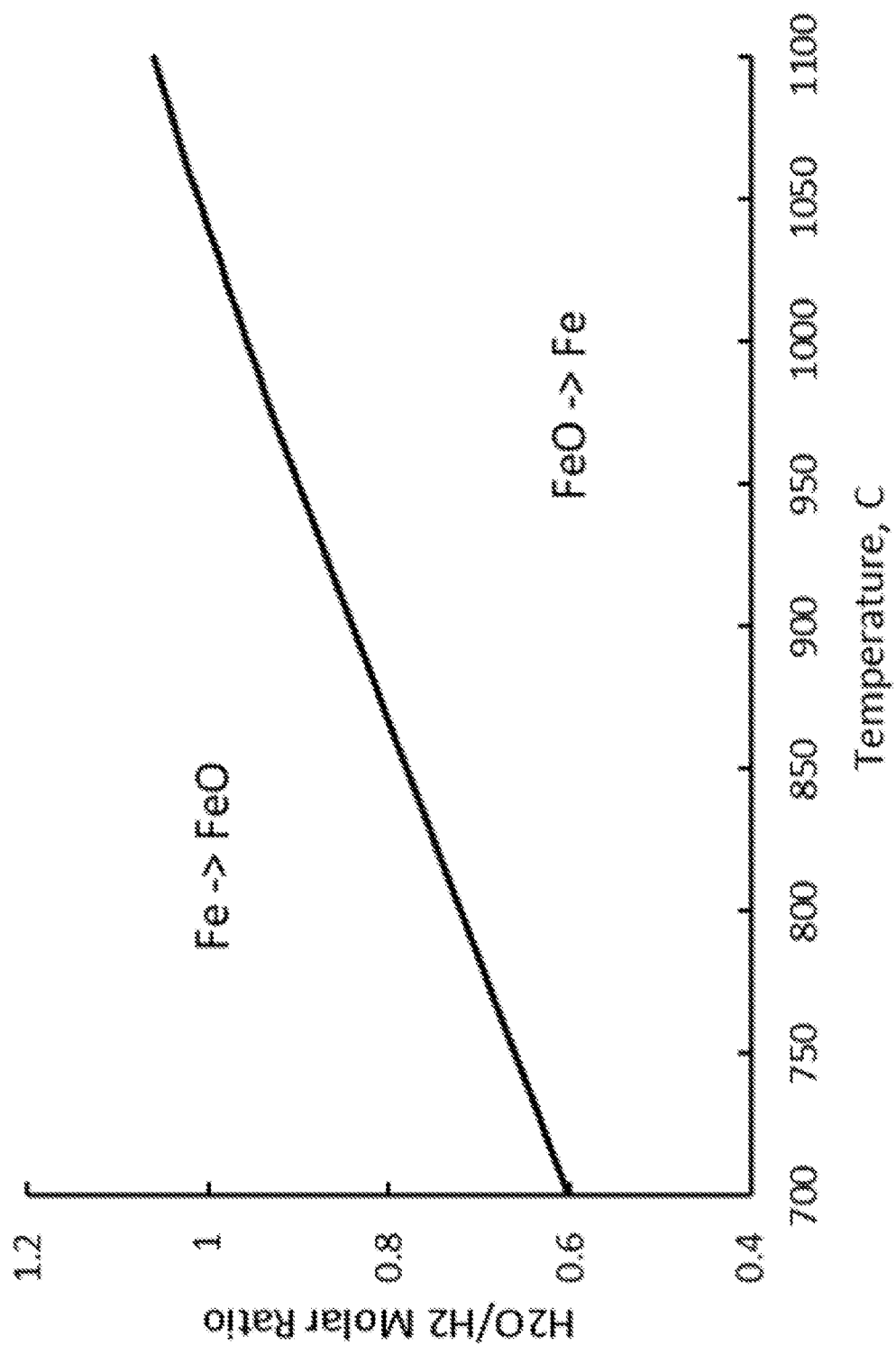
FIG. 8 show exemplary operating modes of example fixed beds for inlet gas composition using $H_2O/H_2$ mole ratio.
Figure 9:
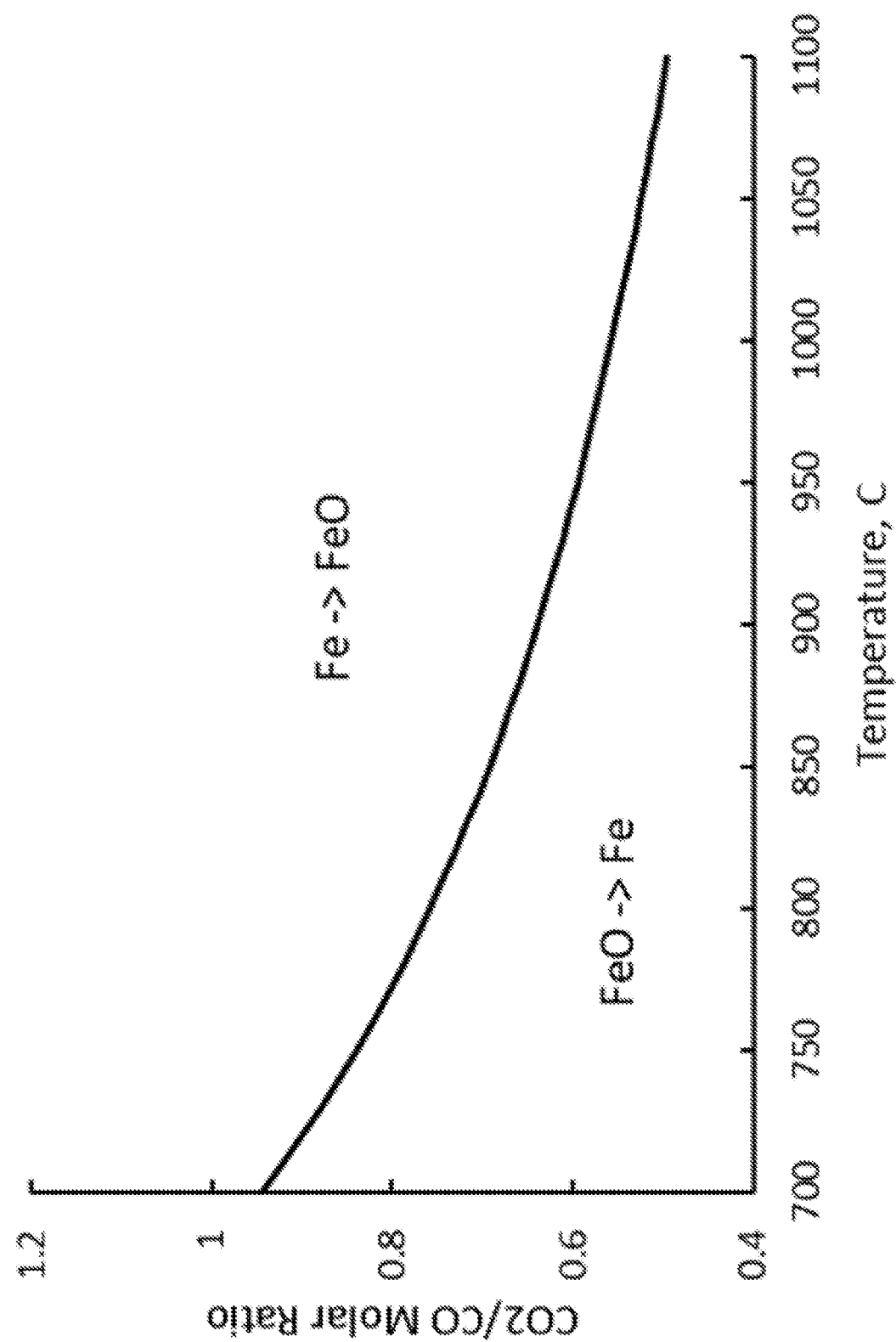
FIG. 9 show exemplary operating modes of example fixed beds for inlet gas composition using $CO_2/CO$ mole ratio.

FIG. 8 and FIG. 9 show two examples that can be used with methods of determining an operating mode of a fixed bed in a reactor system with a given inlet gas composition. The example shown in FIG. 8 uses a gas mixture of $H_2O$ and $H_2$ as inlet, while the example shown in FIG. 9 uses a gas mixture of $CO_2$ and CO as inlet. Here $H_2$ and CO are the reducing gases and $H_2O$ and $CO_2$ are the oxidizing gases for FIG. 8 and FIG. 9, respectively.

As shown in FIG. 8, when the inlet gas ratio of $H_2O/H_2$ is greater than the value represented by the curve, the inlet gas is an oxidizing gas and will oxidize Fe in the bed into FeO. When the inlet gas ratio of $H_2O/H_2$ is less than the value represented by the curve, the inlet gas is a reducing gas and will reduce FeO in the bed into Fe. Therefore, the curve in FIG. 8 represents a critical inlet gas composition that neither reduces nor oxidizes the solid material in the bed. In the example shown in FIG. 9, the $CO_2/CO$ ratio is used as the indicator of whether the gas mixture is an oxidizing or a reducing mixture, in a similar way to the previous example shown in FIG. 8. It is noted that in both examples, the critical inlet gas composition that makes the gas neither reducing nor oxidizing varies with temperature.

II. Example Systems and Configurations

Broadly, example systems disclosed and contemplated herein include 1 reactor/1 reactor system, 2 reactors/2 reactor systems, or more than 2 reactors/reactor systems. Each configuration is discussed below.

A. Exemplary Configurations with One Reactor System

FIG. 1 shows a schematic diagram of example syngas generation system 100. As shown, syngas generation system 100 includes reducing gas source 102, oxidant source 106, and reactor system 114. Also shown in FIG. 1 are flow regulation unit 104, flow regulation unit 108, input stream oxygen (O) monitor 110, and output stream oxygen (O) monitor 118. Other embodiments can include more or fewer components.

Reactor system 114 includes one or more reactors operating under similar conditions and receiving the same input stream 112. Typically, when reactor system 114 includes more than one reactor, each reactor operates in parallel. Output stream 116 from reactor system 114 includes syngas generated in reactor system 114. Each reactor in reactor system 114 also includes metal oxide. In some implementations, the reactors are in fixed bed configurations.

Input stream 112 is provided to reactor system 114, and the input stream includes reducing gas and oxidant provided from reducing gas source 102 and oxidant source 106, respectively. In some instances, reducing gas from reducing gas source 102 is pre-heated before entering reactor system 114. Heat for increasing the temperature of the reducing gas can be provided in various ways, such as with heat exchangers, waste heat streams, solar energy, gas energy, and electrical energy. The net reactions occurring in reactor system 114 are endothermic.

One or more components can be used to adjust a mole ratio of reducing gas to oxidant in the input stream 112. For instance, reducing gas source 102 can include flow regulation unit 104 and oxidant source 106 can include flow regulation unit 108. Flow regulation units 104 and 106 operate to adjust the flow rate of reducing gas and oxidant, respectively. An example flow regulation unit is, without limitation, a valve.

As another example not shown in FIG. 1, input stream 112 can receive flow from a first reducing gas/oxidant source having a first mole ratio of reducing gas to oxidant and from a second reducing gas/oxidant source having a second mole ratio of reducing gas to oxidant. Each of these combined sources can include flow regulation devices usable to adjust the mole ratio of reducing gas and oxidant in input stream 112.

Broadly, during operation, oxygen monitor 110 measures an oxygen (O) content of input stream 112, and oxygen monitor 118 measures an oxygen (O) content of output stream 116. The oxygen content refers to oxygen present in any gas stream in molecular form (eg. $CO_2$, $H_2O$, CO etc.). Oxygen content can be measured using one or more devices known in the art. Typically, oxygen monitor 110 and oxygen monitor 118 are in electrical communication with one or more controllers (not shown in FIG. 1), where the one or more controllers can adjust the mole ratio of reducing gas to oxidant in the input stream 112.

B. Exemplary Configurations with Two or More Reactor Systems

Figure 2:
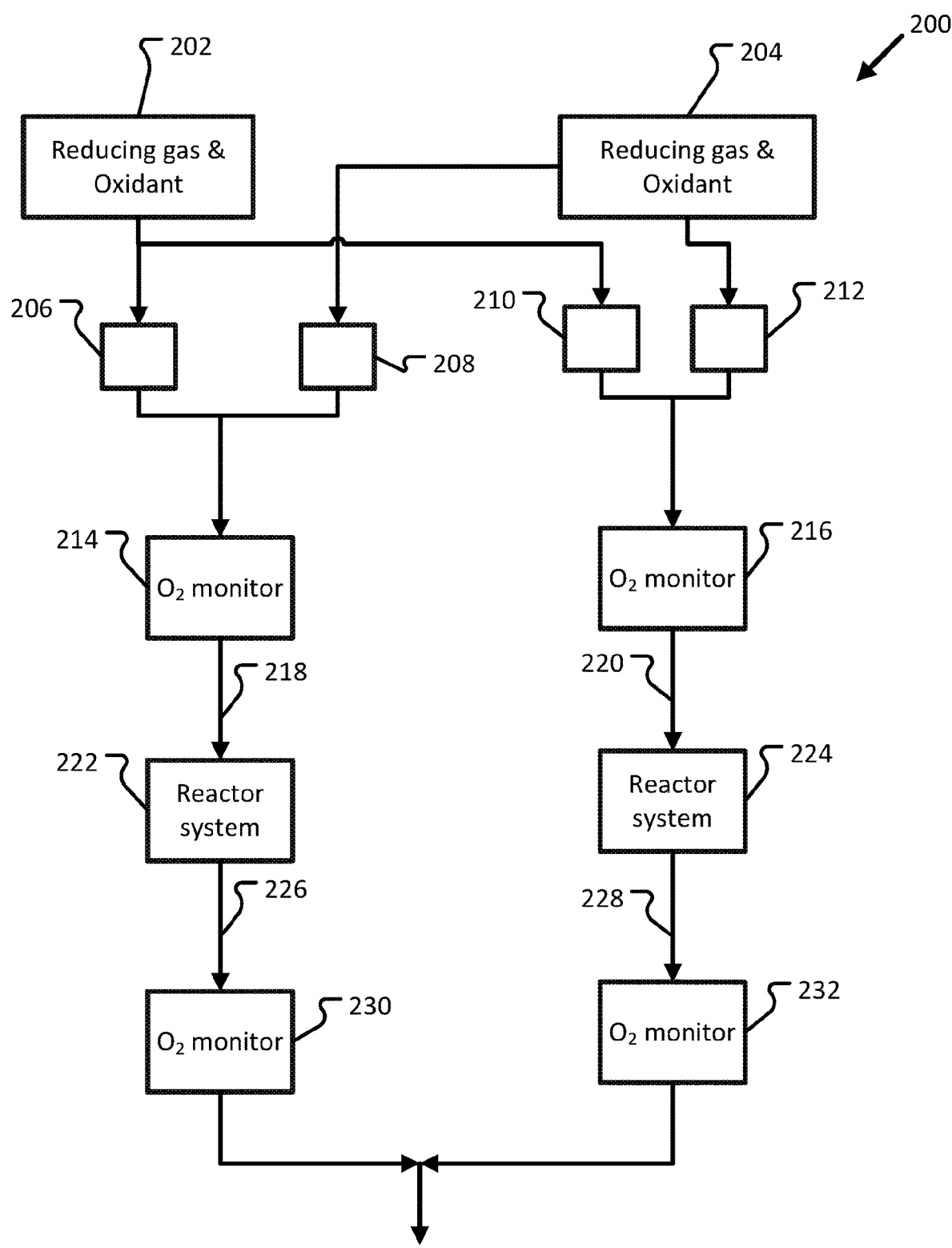
FIG. 2 is a schematic diagram of another example system for syngas generation.

FIG. 2 shows a schematic diagram of example syngas generation system 200. As shown, syngas generation system 200 includes reducing gas and oxidant source 202, reducing gas and oxidant source 204, reactor system 222, and reactor system 224. Also shown in FIG. 2 are flow regulation units 206, 208, 210, and 212, input stream oxygen (O) monitor 214, input stream oxygen (O) monitor 216, output stream oxygen (O) monitor 230, and output stream oxygen (O) monitor 232. Other embodiments can include more or fewer components.

Syngas generation system 200 includes two reactor systems: reactor system 222 and reactor system 224. Reactor system 222 and reactor system 224 operate at different mole ratios of reducing gas to oxidant. Each reactor system 222 and 224 can include multiple reactors operating in parallel. Each reactor in reactor system 222 and reactor system 224 also includes metal oxide. In some implementations, the reactors are in fixed bed configurations.

Reducing gas and oxidant source 202 provides a first mole ratio of reducing gas to oxidant and reducing gas and oxidant source 204 provides a second mole ratio of reducing gas to oxidant, where the first mole ratio and the second mole ratios are different during typical operation.

Reactor system 222 receives input stream 218 that includes reducing gas and oxidant. Flow regulation unit 206 adjusts a flow rate from reducing gas and oxidant source 202 into input stream 218. Flow regulation unit 208 adjusts a flow rate from reducing gas and oxidant source 204 into input stream 218. Oxygen monitor 214 measures the oxygen (O) content of input stream 218 provided to reactor system 222.

Reactor system 224 receives input stream 220 that includes reducing gas and oxidant. Flow regulation unit 210 adjusts a flow rate from reducing gas and oxidant source 202 into input stream 220. Flow regulation unit 212 adjusts a flow rate from reducing gas and oxidant source 204 into input stream 220. Oxygen monitor 216 measures the oxygen (O) content of input stream 220 provided to reactor system 224.

Reactor system 222 provides output stream 226 that includes syngas generated in reactor system 222. Oxygen monitor 230 measures the oxygen (O) content of output stream 226 provided by reactor system 222.

Reactor system 224 provides output stream 228 that includes syngas generated in reactor system 224. Oxygen monitor 232 measures the oxygen (O) content of output stream 228 provided by reactor system 224.

Typically, oxygen monitor 214, oxygen monitor 216, oxygen monitor 230, and oxygen monitor 232 are in electrical communication with one or more controllers (not shown in FIG. 2). The one or more controllers can adjust the mole ratio of reducing gas to oxidant in input stream 218 and input stream 220.

In implementations with three or more reactor systems, not shown in the figures, the system can be arranged similarly to system 200. That is, the third (and other) reactor systems can be provided with input streams including an adjustable reducing gas to oxidant mole ratio. Oxygen content monitors are disposed upstream and downstream of each reactor system.

C. Exemplary Operating Conditions

Example systems disclosed herein can operate at various conditions. For instance, reactors/reactor systems disclosed herein typically operate at temperatures of 700° C. to 1100° C. In various implementations, reactors/reactor systems can operate at 700° C. to 1000° C.; 800° C. to 1100° C.; 700° C. to 900° C.; 800° C. to 1000° C.; 900° C. to 1100° C.; 850° C. to 1050° C.; 700° C. to 800° C.; 800° C. to 900° C.; 900° C. to 1000° C.; or 1000° C. to 1100° C. In various implementations, reactors/reactor systems can operate at no less than 700° C.; no less than 800° C.; no less than 900° C.; or no less than 1000° C. In various implementations, reactors/reactor systems can operate at no more than 1100° C.; no more than 1000° C.; no more than 900° C.; or no more than 800° C.

Reactors/reactor systems disclosed herein typically operate at pressures of 0.1 atm to 80 atm. In various implementations, reactors/reactor systems can operate at 0.1 atm to 60 atm; 0.5 atm to 50 atm; 0.5 atm to 5 atm; 1 atm to 40 atm; 2 atm to 30 atm; 5 atm to 20 atm; 10 atm to 15 atm; 1 atm to 20 atm; 20 atm to 40 atm; or 40 atm to 60 atm. In various implementations, reactors/reactor systems can operate at no less than 0.1 atm; no less than 0.5 atm; no less than 1 atm; no less than 5 atm; no less than 10 atm; no less than 20 atm; no less than 30 atm; no less than 40 atm; or no less than 50 atm. In various implementations, reactors/reactor systems can operate at no more than 60 atm; no more than 50 atm; no more than 40 atm; no more than 30 atm; no more than 20 atm; no more than 10 atm; no more than 5 atm; no more than 2 atm; no more than 1 atm; or no more than 0.5 atm.

In one reactor system configurations, such as that shown schematically in FIG. 1, each reactor in the system has constant or near constant mole ratios of reducing gas to oxidant, defined as $x_1$. At typical steady state operation, $x_1$ is less than $10^6$ and greater than $10^{-6}$.

In two reactor system configurations, such as that shown schematically in FIG. 2, each reactor in a first reactor system has constant or near constant mole ratios of reducing gas to oxidant, defined as $x_1$, and each reactor in a second reactor system has constant or near constant mole ratios of reducing gas to oxidant, defined as $x_2$. At typical steady state operation, $x_2$ is less than $x_1$, and $x_1$ and $x_2$ are less than $10^6$ and greater than $10^{-6}$. The mole ratios will be such that $x_1$ represents a net reducing gas based on the metal oxide phase present in the first reaction system. This can be determined based on the phase diagram of the metal oxide similar to the example mentioned in FIG. 8 and FIG. 9. Similarly, $x_2$ represents a net oxidizing gas to the metal oxide phase present in the second reaction system.

In implementations with more than two reactor system configurations, each reactor in each reactor system has constant or near constant mole ratios of reducing gas to oxidant, defined as $x_1, x_2, x_3 \ldots `x_n`$ a first reactor system has constant or near constant mole ratios of reducing gas to oxidant, defined as $x_1$, and the second reactor system has constant or near constant mole ratios of reducing gas to oxidant, defined as $x_2$ and so on till the $n^{th}$ reactor system that has constant or near constant mole ratios of reducing gas to oxidant, defined as $x_n$. At typical steady state operation, there are m number of streams, such that m<n, where $x_1$ to $x_m$ streams are net reducing in nature and $x_{m+1}$ to $x_n$ are net oxidizing in nature with respect to the solid phase present in the reaction system. The nature of the stream (reducing or oxidizing) can be determined based on the phase diagram of the metal oxide similar to the example mentioned in FIG. 8 and FIG. 9, where $x_1$ to $x_n$ are less than $10^6$ and greater than $10^{-6}$ in all these reaction systems.

The various mole ratios mentioned above can be procured from natural sources or combined on-site or off-site to produce the desired compositions for the reaction systems. Some examples of natural sources for such gases include natural gas with x=0.9-0.99, biogas with x=0.3-0.7 etc.

D. Exemplary Reducing Gases and Oxidant

Various reducing gases and oxidizing gases can be used in exemplary systems and methods disclosed herein. For instance, reducing gases can include: natural gas, which can include methane ($CH_4$), $H_2$, CO, and mixtures thereof. Example oxidant includes $CO_2$, steam ($H_2O$), and mixtures thereof.

E. Exemplary Metal Oxides

Reactors in example systems disclosed herein include metal oxides/metal alloys. These metal oxides/metal alloys act as oxygen carriers that can undergo reduction/oxidation reactions with gaseous reducing agents, such as methane, and oxidizing agents, such as $CO_2$ or $H_2O$. In some instances, the metal oxides are provided in powder form. In some instances, the powder form has an average particle size between 150 μm and 250 μm. The metal oxides can also be in pellet form of various shapes with largest dimensions up to 3 mm.

Certain design considerations for metal oxides include reactivity, recyclability and mechanical strength, along with the oxygen carrying capacity. Transition metal oxides such as iron oxide, nickel oxide, copper oxide can be used as active oxygen carriers and have high oxygen carrying capacity, good reactivity and low cost among all the transition metal oxide candidates.

The recyclability of active metal oxide oxygen carriers can be promoted by adding supportive oxides which affect lattice oxygen ion diffusivity. The support material can be any support material known and used in the art. Non-limiting examples of support materials include, but are not limited to, silica, alumina, ceria, titania, zirconia, or a combination comprising two or more of the aforementioned supports, such as $MgAl_2O_4$. The amount of support material can vary from 20%, 30% 40%, 50%, 60%, 70%, 80% or any value in between.

Metal oxide reactivity can be enhanced by low concentration dopant modification. Catalytic transition metal dopants include, but are not limited to, Ni, Co, Cu, Sc, Ti, V, Cr, Mn, Zn, Y, Zr, Nb, Mo, Tc, Ru, Rh, Pd, Ag, Cd, Lu, Hf, Ta, W, Re, Os, Ir, Pt, and Au. It is thought that these transition metal dopants play three roles in reactivity enhancement of cyclic chemical looping redox reactions: (1) providing extra reaction sites during $CO_2$ and $CH_4$ conversion in addition to the host transition metal oxides such as iron oxides, cobalt oxides, nickel oxides, copper oxides and manganese oxides; (2) the nature of aliovalent dopants, such as $Cu^{2+}$, $Co^{2+}$, $Ni^{2+}$ vs $Fe^{3+}$, results in an increase of oxygen vacancies which promotes oxygen ion transport in methane partial oxidation; and (3) these catalytic dopants can lower reaction energy barriers of $CO_2$ and $CH_4$ activation with the host transition metal oxide materials such as FeO, $FeTiO_3$, $FeAl_2O_4$, $CoTiO_3$, etc.

III. Example Methods of Operation

Broadly, example methods disclosed and contemplated herein involve operating systems described above.

A. Example Methods of Operating Configurations with One Reactor System

Figure 3:
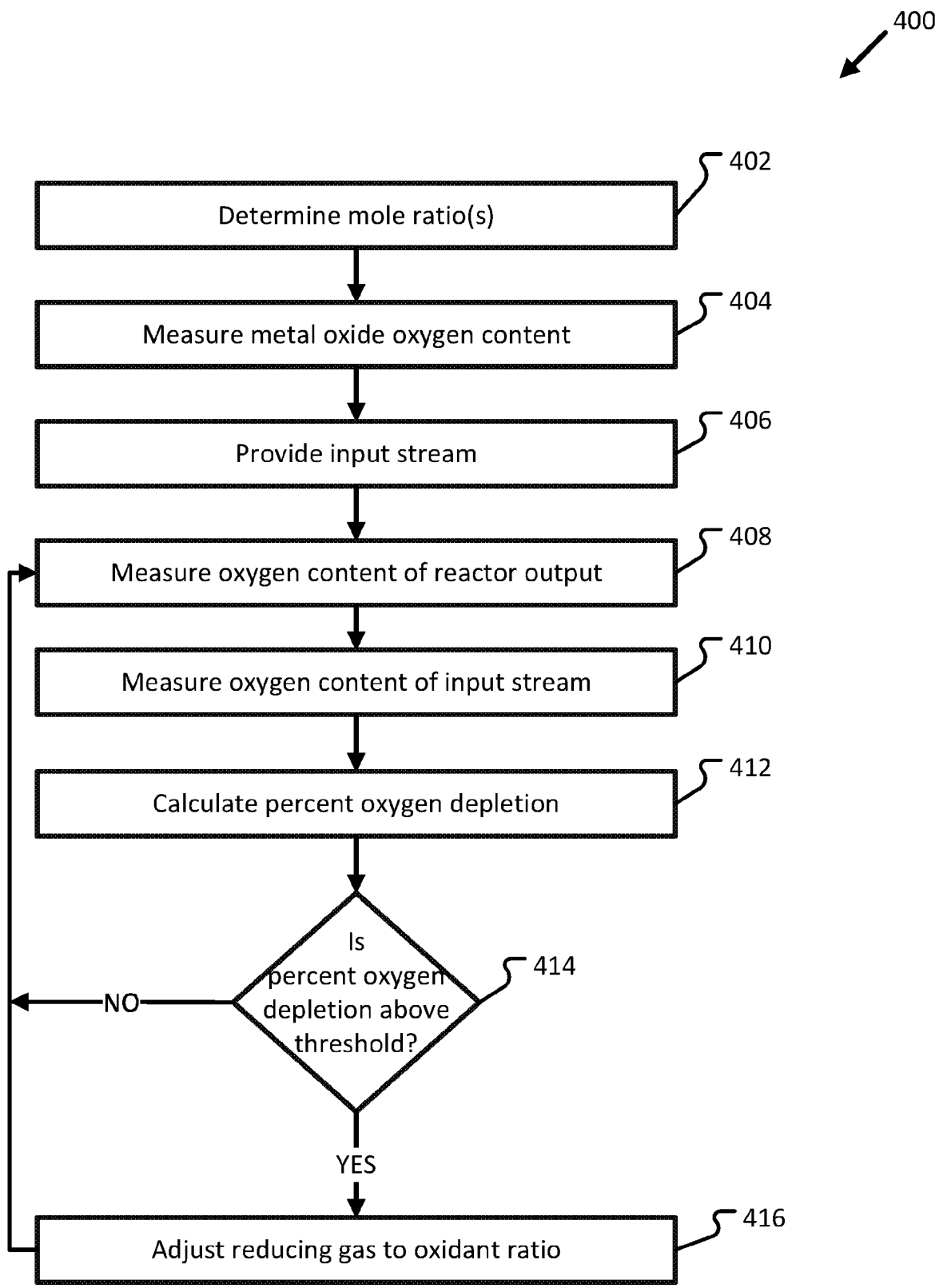
FIG. 3 shows an example method for operating a reactor system.

FIG. 3 shows example method 400 for operating a reactor system. Method 400 involves operation of a single reactor or a group of reactors operating under the same or similar conditions. Other embodiments can include more or fewer operations.

Prior to steady-state operation, one or more start-up operations may take place. For instance, reactors in the system may be heated to desired temperatures and operating pressures. Typically, the reactors in the system are heated to a temperature between 700° C. and 1100° C. In some instances, the reactors in the system are heated to a temperature between 800° C. and 1050° C. Typically, the reactors in the system are operated at a pressure between 0.1 atm and 80 atm. In some instances, the reactors in the system are operated at a pressure between 0.5 atm and 5 atm As another example, a value or range of values for a target mole ratio of reducing gas to oxidant may be determined (operation 402). Metal oxide oxygen content is also measured (operation 404) before steady-state operation. The oxygen content of the metal oxide can be monitored in-situ by keeping track of the oxygen in the inlet and the outlet stream of the reactor system. Through an oxygen balance, any accumulation or removal of oxygen from the metal oxide can be estimated. Alternatively and additionally, if a provision for solid sampling is present in the reaction system, the oxygen content can be measured by using one or more devices known in the art.

In some instances, metal oxide is in a powder form. The average particle size of the metal oxide powder can be between 150 μm and 250 μm. Typically, metal oxide is of the form $Fe_xM_yO_z$. In some instances, M is titanium (Ti) or nickel (Ni). In some instances, M is nickel (Ni) and cobalt (Co). The metal oxide can be supported on $MgAl_2O_4$.

An input stream is also provided to the reactor system (operation 406). The input stream receives a reducing gas stream including reducing gas and an oxidant stream including oxidant. An example reducing gas is natural gas, which can include methane ($CH_4$). An example oxidant includes $CO_2$ and/or steam ($H_2O$). A set of mass flow controllers may be used to adjust the mole ratio in the input stream to the desired mole ratio value or range of mole ratio values.

The oxygen content of the reactor system output stream is also measured (operation 408). Measuring the oxygen content can be performed at one or more locations downstream of the reactor system. Measurements can be obtained continuously or at periodic intervals, such as, for instance, every 1 second, every 2 seconds, every 5 seconds, every 10 seconds, every 20 seconds, every 30 seconds, every 1 minute, every 2 minutes, every 5 minutes, every 10 minutes, every 15 minutes, every 20 minutes, every 30 minutes, or every 60 minutes.

The oxygen content of the input stream is also measured (operation 410). Measuring the oxygen content can be performed at one or more locations upstream of the reactor system. Measurements can be obtained continuously or at periodic intervals, such as, for instance, every 1 second, every 2 seconds, every 5 seconds, every 10 seconds, every 20 seconds, every 30 seconds, every 1 minute, every 2 minutes, every 5 minutes, every 10 minutes, every 15 minutes, every 20 minutes, every 30 minutes, or every 60 minutes.

Next, a percent oxygen depletion is calculated (operation 412) for the reactor system. The percent oxygen depletion can be calculated by dividing the difference of the oxygen (O) in the outlet stream and the input stream by the oxygen (O) content in the metal oxide before startup. This calculation can be expressed as the following formula:

$$\text{Percent } O \text{ depletion} = \frac{O \text{ content in outlet stream} - O \text{ content in input stream}}{\text{inital } O \text{ content of metal oxide}} \times 100\%$$

Based on the oxygen depletion calculated in operation 412, a determination is made whether the percent oxygen depletion is above a threshold (operation 414). The threshold can be predetermined. Example thresholds include, but are not limited to, 5%, 6%, 7%, 8%, 9%, 10%, 11%, 12%, 13%, 14%, or 15%.

When it is determined that the percent oxygen depletion is not above the threshold, then method 400 can return to monitor the oxygen content of the output stream (operation 408) and input stream (operation 410).

When it is determined that the percent oxygen depletion is above the threshold, the reducing gas to oxidant mole ratio is adjusted (operation 416). Adjusting the reducing gas to oxidant mole ratio can include actuating one or more flow controllers for a reducing gas stream and for an oxidant stream. In some implementations, two mixed streams are available, where each stream has a different mole ratio of reducing gas to oxidant, and one or more flow controllers actuate the relative amounts of each stream as the input stream.

For instance, the threshold for O depletion will be estimated based on pre-determined information of the metal oxide system. This information is related to the kinetics of the gas-solid reactions based on the phases that are generated during O depletion of the metal oxide. For instance, if the O depletion threshold is defined at 10%, upon reaching this threshold, the gas composition will be adjusted to ensure the O content of the metal oxide and thus the desired solid phases are maintained in the reaction system. This adjustment can be achieved by adjusting the reducing gas to oxidizing gas ratio based on the reducing and oxidizing kinetics of the gas-solid system. The adjustment will vary with metal oxide system, gas composition, pressure, temperature gas flow rate, gas hourly space velocity of the reaction system, etc.

After adjusting the mole ratio of reducing gas to oxidant, method 400 can return to monitor the oxygen content of the output stream (operation 408) and input stream (operation 410).

The mole ratio of the input stream may also have to be adjusted if there is an indication of carbon deposition on the metal oxide surface. Carbon deposition can be monitored by measuring the carbon accumulation in the reactor system by looking at the compositions of the input and the out streams. These compositions can be measured using one or more devices known in the art.

B. Example Methods of Operating Configurations with Two or More Reactor Systems

Figure 4:
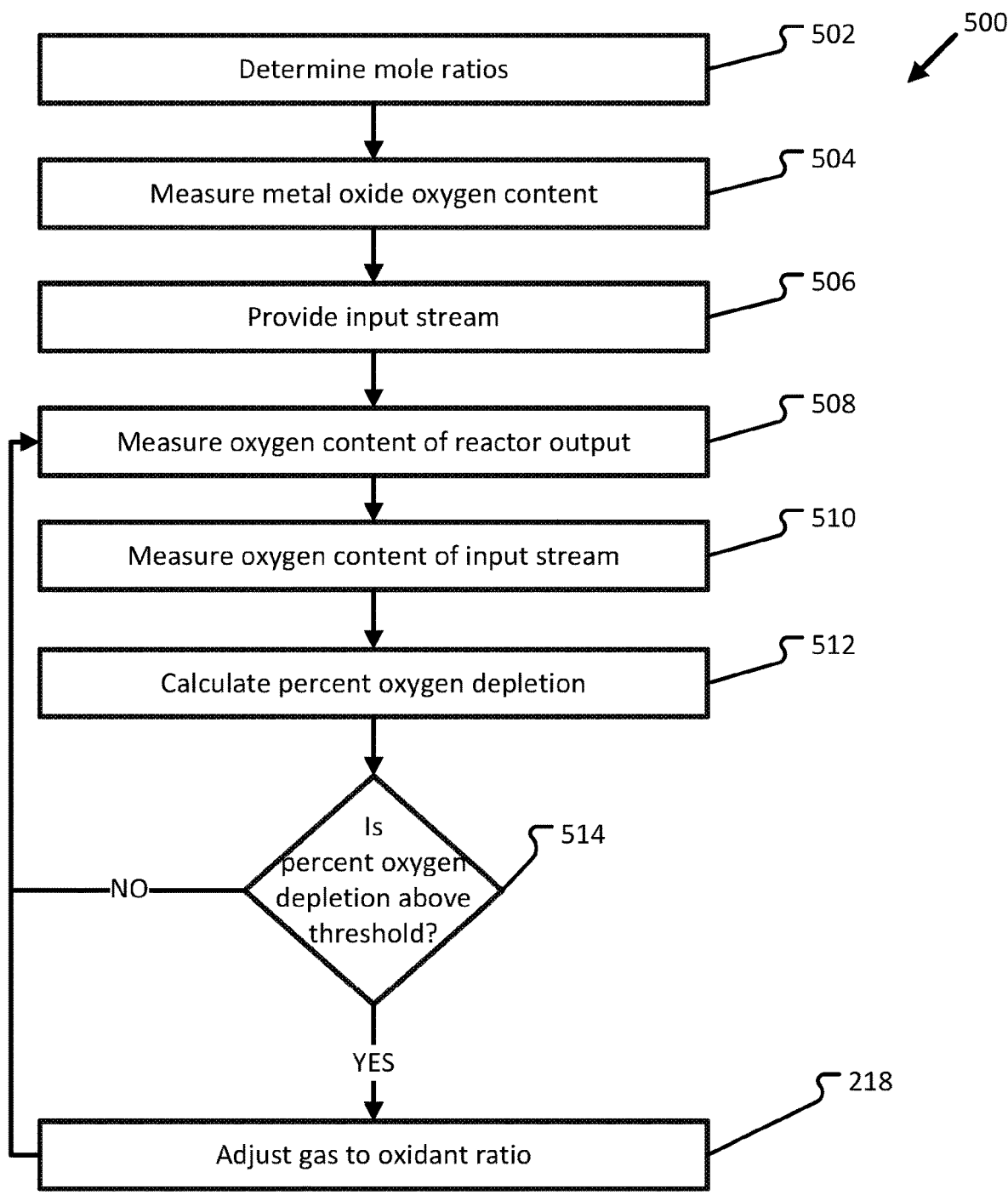
FIG. 4 shows another example method for operating a reactor system.

FIG. 4 shows example method 500 for operating a reactor system. Method 500 involves operation of a two or more reactor systems, where each reactor system can include one or more reactors operating under the same or similar conditions. Other embodiments can include more or fewer operations.

Prior to steady-state operation, one or more start-up operations may take place. Ranges of operating temperatures and pressures are the same as those described above with reference to method 400, and will not be repeated here for purposes of brevity.

Method 500 also includes determining a first mole ratio and a second mole ratio (operation 502). The first mole ratio of reducing gas to oxidant, $x_1$, is for the first reactor system. The second mole ratio of reducing gas to oxidant, $x_2$, is for the second reactor system. In implementations with more than two reactor systems, mole ratios for each reactor system are also determined.

Metal oxide content is also measured (operation 504) before startup. Typically, the same metal oxide is used in each reactor system. The oxygen content of the metal oxide can be monitored in-situ by keeping track of the oxygen in the inlet and the outlet stream of the reactor system. Through an oxygen balance, any accumulation or removal of oxygen from the metal oxide can be estimated. Alternatively and additionally, if a provision for solid sampling is present in the reaction system, the oxygen content can be measured by using one or more devices known in the art. Exemplary metal oxides are described above with reference to method 400, and will not be repeated here for purposes of brevity.

Input streams are also provided to each reactor system (operation 506). Exemplary aspects of the input stream are described above with reference to method 400 and system 200, and will not be repeated here for purposes of brevity.

The oxygen content of each reactor system output stream is measured (operation 508), and the oxygen content of each reactor system input stream is measured (operation 510). Exemplary aspects of oxygen content measuring are described above with reference to method 400 and system 200, and will not be repeated here for purposes of brevity.

Next, a percent oxygen depletion is calculated (operation 512) for each reactor system. As described in greater detail above, calculating percent oxygen depletion for each reactor system can be expressed as the following formula:

$$\text{Percent } O \text{ depletion} = \frac{O \text{ content in outlet stream} - O \text{ content in input stream}}{\text{inital } O \text{ content of metal oxide}} \times 100\%$$

Based on the oxygen depletion calculated in operation 512, a determination is made whether the percent oxygen depletion in a given reactor system is above a threshold (operation 514). The threshold can be predetermined. Example thresholds include, but are not limited to, 5%, 6%, 7%, 8%, 9%, 10%, 11%, 12%, 13%, 14%, or 15%.

When it is determined that the percent oxygen depletion is not above the threshold, then method 400 can return to monitor the oxygen content of the output stream (operation 408) and input stream (operation 410).

When it is determined that the percent oxygen depletion is above the threshold, the reducing gas to oxidant mole ratio is adjusted (operation 416). Adjusting the reducing gas to oxidant mole ratio can include actuating one or more flow controllers for a reducing gas stream and for an oxidant stream. In some implementations, two mixed streams are available, where each stream has a different mole ratio of reducing gas to oxidant, and one or more flow controllers actuate the relative amounts of each stream as the input stream.

As an example, when the operating conditions have a high ratio of reducing gas to oxidant, reaction kinetics may lead to a higher degree of carbon formation through the reactor system. This is typically characterized by a breakthrough curve, wherein after a given amount of time, the amount of unconverted reducing gas in the output stream will start to increase. In such a kinetically controlled operating regime, it can be useful to switch over to a lower mole ratio of oxidant to the reducing gas to mitigate the carbon formation before switching back to the original input feed condition.

An example representation of this variation in operation condition could involve periodic swinging for all reactors in the reactor system. Specifically, in one type of swing, reactors in both systems could be simultaneously alternated between two different mole ratios. As one example, each reactor system could operate at a different mass ratio simultaneously, which could then be switched depending on the degree of kinetic control desired. As another example, a first reactor system is operated at the relatively highest mole ratio and a second reactor system is operated at a lower mole ratio. For systems with more than two reactor systems, one reactor system can operate at the highest mole ratio, one reactor system at the lowest mole ratio, and the other reactor systems operate at stepped down values between the high and low mole ratios.

After adjusting the mole ratio of reducing gas to oxidant, method 400 can return to monitor the oxygen content of the output stream (operation 408) and input stream (operation 410).

IV. Experimental Examples

Various aspects of the systems and methods were experimentally evaluated. Without limitation, those experiments and the results are discussed below.

A. Thermodynamic Calculations for Example Systems

This section discusses thermodynamic calculation results of example systems obtained using ASPENPLUS v10 (Aspen Technology, Inc., Bedford, Mass.) and compares the syngas production performance of the example systems to conventional steam methane reforming process. The simulation results obtained in this section are based on the principle of Gibbs free energy minimization. The example system has been investigated under different temperatures, pressures, and using various metal oxide materials. Two operating modes, namely constant feedstock mode and alternating feedstock mode, have been investigated.

The first set of thermodynamic calculations were conducted using the constant feedstock operating mode under 1000° C., 10 atm. $FeTiO_3$ was used as the metal oxide material in the fixed bed. $CH_4$, $CO_2$ and $H_2O$ were co-injected into the fixed bed reactor to react with $FeTiO_3$. While $CH_4$ continuously extracted oxygen from $FeTiO_3$, the oxygen vacancy was immediately filled by $H_2O$ and $CO_2$. High purity syngas is generated without overall change in $FeTiO_3$ oxidation state. The system performance of case 1 is summarized in Table 1, below.

TABLE 1

| Performance of the SP system using $FeTiO_3$ at 1000° C., 10 atm. ||
|---|---|
| Operation mode | Constant feedstock |
| Temperature, ° C. | 1000 |
| Pressure, atm | 10 |
| Feedstock | $CH_4$, $H_2O$, $CO_2$ |
|  | ($H_2O/CH_4$ = 1.15, $CO_2/CH_4$ = 0.45) |

TABLE 1-continued

| Performance of the SP system using $FeTiO_3$ at 1000° C., 10 atm. ||
|---|---|
| Operation mode | Constant feedstock |
| $CH_4$ conversion, % | 97 |
| Syngas yield, | 3.89 |
| ($H_2$ + CO) out/$CH_4$ in |  |
| Syngas purity, % | 95 |

Definitions of $CH_4$ conversion, syngas yield and syngas purity are given below:

$$CH_4 \text{ conversion} = \left(1 - \frac{\text{unreacted } CH_4 \text{ in syngas product}}{\text{total } CH_4 \text{ feedstock}}\right) \times 100\%$$

$$\text{syngas yield} = \frac{H_2 + CO}{\text{total } CH_4 \text{ feedstock}}$$

$$\text{syngas purity} = \left(\frac{H_2 + CO}{\text{total syngas excluding } H_2O}\right) \times 100\%$$

The second set of thermodynamic calculations were conducted using alternating feedstock under 1000° C., 30 atm. FeO and $Fe_2SiO_4$ were used as the metal oxide material in the fixed bed simulation. As previously mentioned, the gaseous feedstock was switched between a reducing gas mixture mainly composed of $CH_4$ (stage I), and an oxidizing gas mixture containing mostly $H_2O$ (stage II). During stage I, $CH_4$ was partially oxidized into syngas while the metal oxide material was reduced to a lower oxidation state. In stage II, the reduced metal oxide was oxidized by $H_2O$ or $CO_2$ back to its original oxidation state while producing $H_2$ or CO.

By separating the operation into two distinct phases, the system thermodynamics of the alternating feedstock operating mode can be fundamentally different from the gaseous phase reactions of conventional steam methane reforming. One difference can be shown in the following case studies.

Two case studies were conducted under 1000° C. and 950° C., respectively, under 30 atm. In each case study, three different systems were simulated and compared. The first system was an FeO—Fe based system. The second system was an $Fe_2SiO_4$—Fe based SP system. The third system was the conventional SMR system serving as a basis for comparison. The parameters compared between the three systems include $CH_4$ conversion, syngas yield, and syngas purity, as defined in the equations given above.

Figure 5:
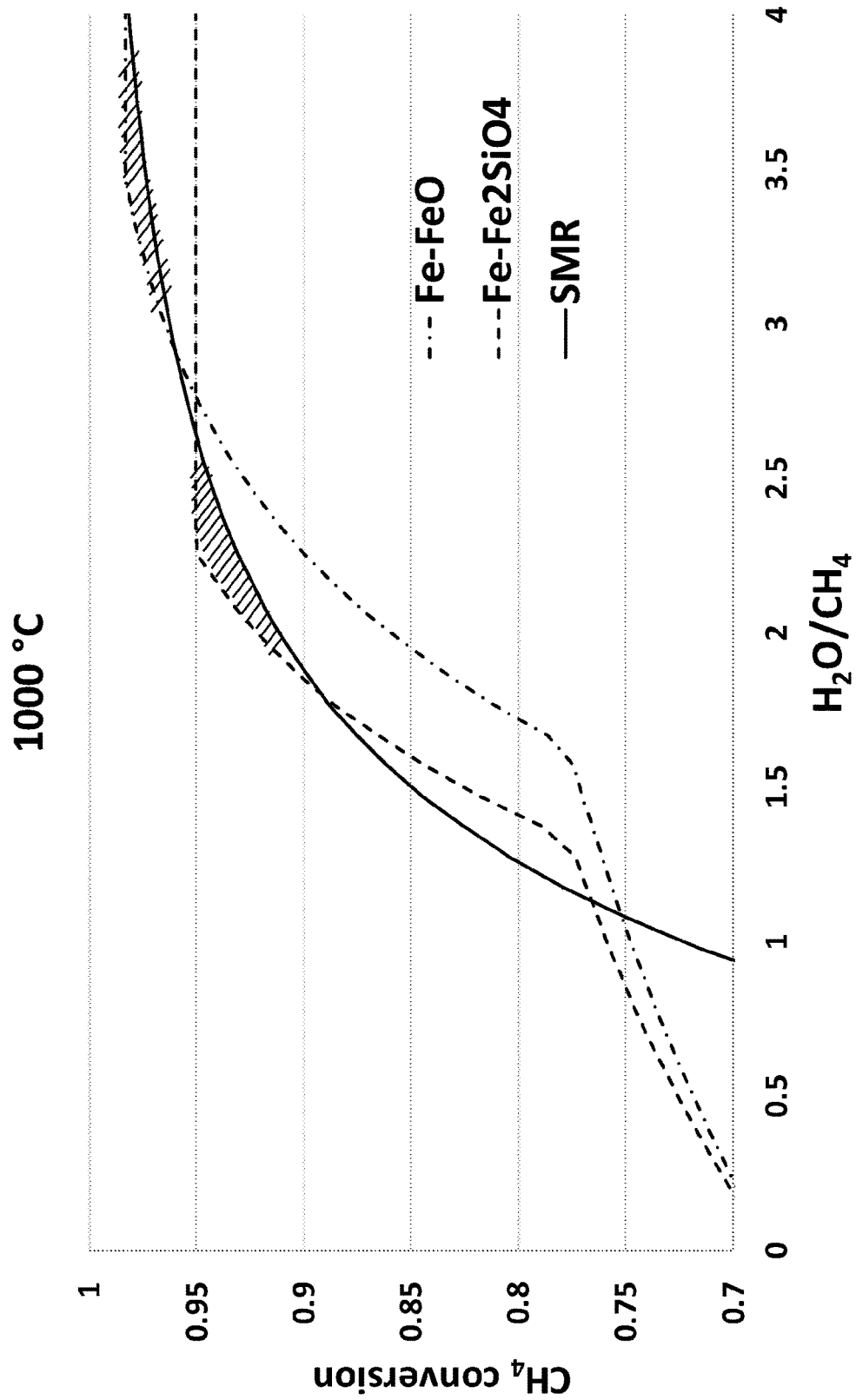
FIG. 5 shows thermodynamic data for methane conversion of various systems at 30 atm and 1000° C.
Figure 6:
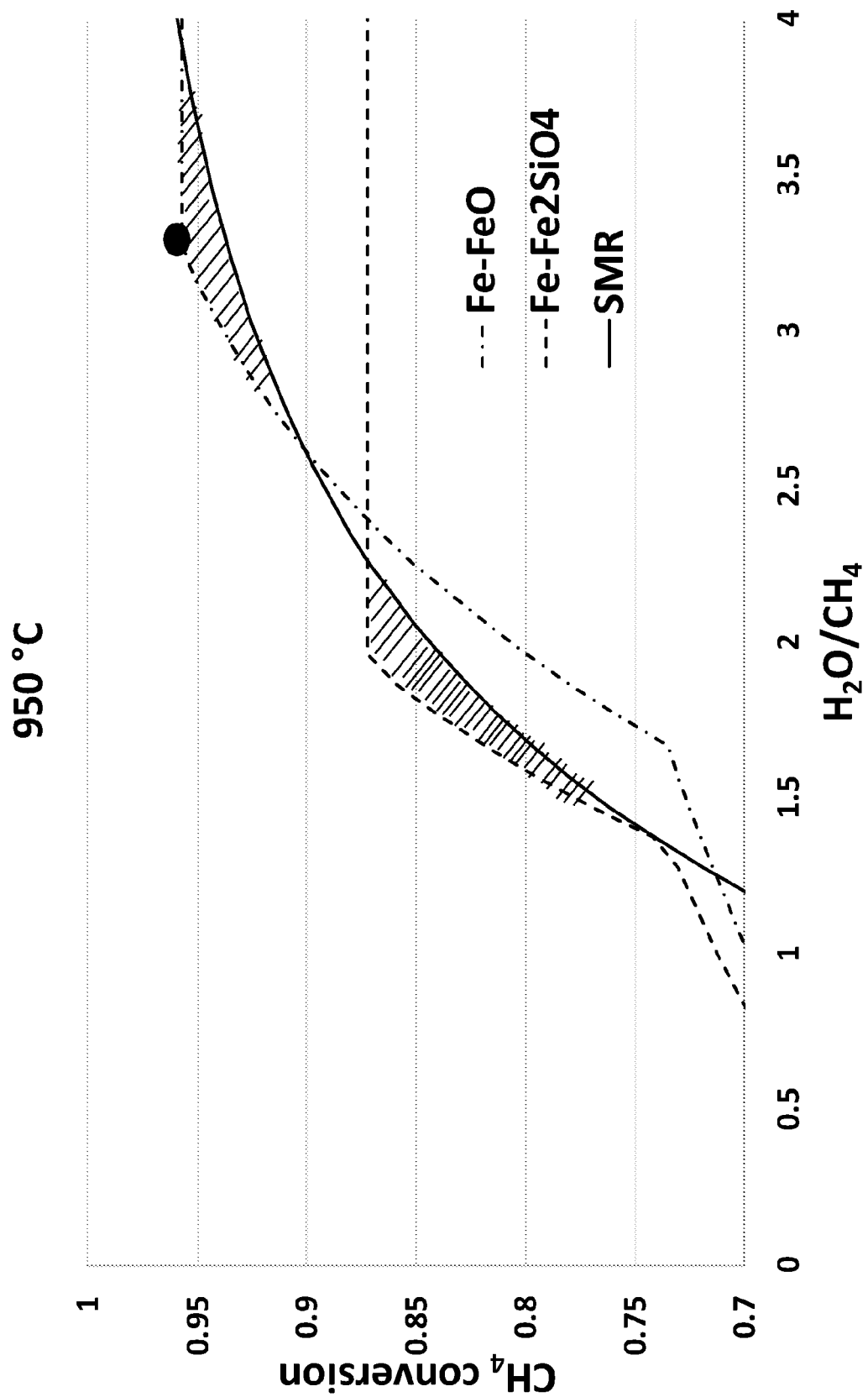
FIG. 6 shows thermodynamic data for methane conversion of various systems at 30 atm and 950° C.

FIG. 5 and FIG. 6 show the comparison of methane conversion of the two example systems and the steam methane reforming (SMR) system under 30 atm, 1000° C. and 950° C., respectively. The x-axis of each graph is the $H_2O/CH_4$ ratio fed into the reactor. For the example systems, the $H_2O$ injection is a sum of the total $H_2O$ injection of the two operating stages. $CH_4$ conversion for the example systems was calculated based on the total syngas produced from the two stages.

As illustrated in FIG. 5 and FIG. 6, as $H_2O/CH_4$ ratio increases, the $CH_4$ conversion keeps increasing for all the three systems. However, the trends of the three systems follow different profiles. For a certain $H_2O/CH_4$ range, the example systems show a higher $CH_4$ conversion than the conventional SMR system, as indicated by the shaded areas in the graphs. If the example system is operated in the shaded area, the $CH_4$ conversion of the overall example process will be higher than the conventional SMR process.

A comparison between the example system using FeO as the metal oxide material with the SMR system operating using the same amount of feedstock ($CH_4$ and $H_2O$) was also conducted. The operating point is indicated by a black dot on FIG. 6. The results are shown in table 2, below.

TABLE 2

Comparison between SP system using FeO and conventional SMR

| Case | Example system, FeO | Conventional SMR system |
|---|---|---|
| $CH_4$ input, kmol/hr | 1 | 1 |
| $H_2O$ input, kmol/hr | 3.33 | 3.33 |
| $H_2$ product, kmol/hr | 3.20 | 3.11 |
| CO product, kmol/hr | 0.67 | 0.65 |
| $CH_4$ conversion, % | 95.7 | 93.9 |
| Syngas yield, % | 3.87 | 3.75 |
| Syngas purity, % | 92.2 | 91.4 |

As shown in the table, by using equal amount of feedstock, the example system is able to achieve higher $CH_4$ conversion, syngas yield, and syngas purity than the SMR process.

B. Kinetic Aspects of Example Systems

This section discusses kinetic aspects of example metal oxide interaction with $CH_4$ as the reducing gas and $CO_2$ as the oxidizing gas over $Fe/FeTiO_3$ as an example metal oxide.

Figure 7:
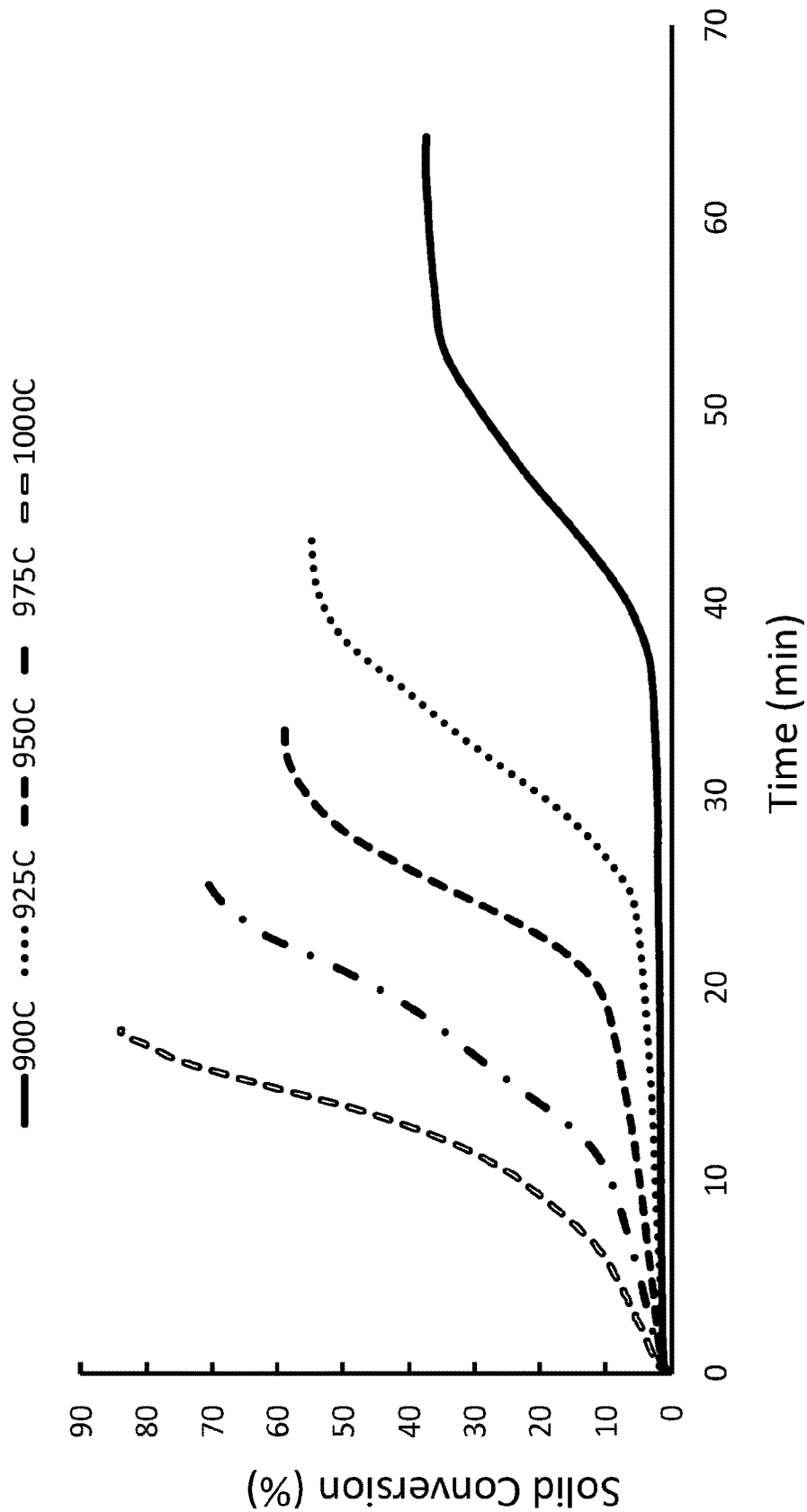
FIG. 7 shows experimental data for a solid conversion profile under $CH_4$ reduction of $FeTiO_3$ at various temperatures.

FIG. 7 shows the solid conversion profile under $CH_4$ reduction of $FeTiO_3$ with 0% depicting $FeTiO_3$ and 100% depicting $Fe+TiO_2$ solid phase. FIG. 7 also highlights differences in reactivities as the reduction proceeds, indicating a change in reaction kinetics with phase change of the metal oxide. These phase change characteristics are absent in conventional catalytic systems, thus providing additional degrees of freedom for the proposed process. These rates also help define the operating conditions for the system and can be considered for the bed preparation step, which may be necessary to attain a suitable starting composition.

Performance of exemplary metal oxide was tested in a U-tube fixed bed reactor. Methane/carbon dioxide ($CH_4/CO_2$) ratios ranging from 0.8 to 9 were tested as feed to the reactor with a total gas flow of 20 ml/min. The reactant gas conversion and product purity were calculated based on gas analysis in a mass spectrometer. The solids were initially reduced under a gas mixture with a mole ratio of $CH_4$ to $CO_2$ of 9 for 15-20 min, to achieve a suitable starting composition. Table 3 shows the gas analysis for Fe—Ti oxide of particle size 150-250 microns at 1000° C.

TABLE 3

Experimental results for Fe-Ti system in a U-tube fixed bed reactor

| $CH_4/CO_2$ in feed | $CH_4$ conversion | $CO_2$ conversion | Dry syngas purity | $H_2/CO$ ratio |
|---|---|---|---|---|
| 1.5 | >95% | >99.5% | >98% | 1.47 |

The gas analysis for a Ni-doped Fe oxide supported on $MgAl_2O_4$ is shown in Table 4. The powder size was between 150-250 microns and the reaction temperature was 1000° C.

TABLE 4

Experimental results for Ni doped Fe oxide-$MgAl_2O_4$ system in a U-tube fixed bed reactor

| $CH_4/CO_2$ in feed | $CH_4$ conversion | $CO_2$ conversion | Dry syngas purity | $H_2/CO$ ratio |
|---|---|---|---|---|
| 0.8 | >99.5% | >92% | >97% | 0.86 |

These reactant conversion and syngas purity values for the two metal oxides tested were steady for a period of over 2 hours, depicting negligible drop-in activity throughout that time.

C. Stratification Analysis of Example Systems

This section discusses stratification for exemplary systems. More specifically, the stratification analysis was for a nickel (Ni)-doped Fe oxide supported on $MgAl_2O_4$ in a U-tube reactor, and the results are shown in Table 5.

TABLE 5

Oxygen content of an exemplary metal oxide across the bed in a U-tube fixed bed reactor

| Layer number (1:inlet and 4:outlet) | Percent (%) oxygen content |
|---|---|
| 1 | 44.78 |
| 2 | 35.06 |
| 3 | 35.64 |
| 4 | 33.11 |

This metal oxide of powder size between 150-250 microns was reacted with a $CH_4/CO_2$ mixture at temperature of 1000° C. and 1 atm pressure. Experimental results are summarized in Table 6.

TABLE 6

Gas phase product results for Ni doped Fe oxide supported on $MgAl_2O_4$ in a U-tube reactor

| $CH_4/CO_2$ in feed | $CH_4$ conversion | $CO_2$ conversion | Dry syngas purity | $H_2/CO$ ratio | $(H_2 + CO)/CH_4$ |
|---|---|---|---|---|---|
| 0.67 | >99.5% | >86.5% | >93.5% | 0.66 | 3.07 |

The metal oxide bed was segregated into 4 layers to investigate the change in oxidation state across the bed. The oxygen content represents the amount of active lattice oxygen that the metal oxide contains. This oxygen content value was estimated by oxidation studies on a thermogravimetric analyzer. Evidently, the oxygen content decreases from the inlet of the bed to the outlet of the bed. These data appear to be evidence of bed stratification and thus of a different reaction mechanism than the traditional catalytic process.

D. Example Metal Oxide Pre-Treatment

Pre-treatment of exemplary metal oxide was also investigated. Pre-treatment of the metal oxide appears to influence the desired oxidation state of the metal oxide. The kinetic equilibrium between the output stream (including product gas) and the stratified solid metal oxide appears directed related to the solid phase present in the reactor. FIG. 7 depicts the different reduction kinetics of $FeTiO_3$, indicating regions of high and low $CH_4$ conversion. The pre-treatment drives the equilibrium towards the high conversion region, thus improving the per pass syngas yield.

Table 7 shows the difference in the performance parameters for the syngen process with and without pre-treatment.

TABLE 7

Experimental results showing effect of pre-treatment on syngas generation.

| Pre-treatment? | $CH_4/CO_2$ in feed | $CH_4$ conversion | $CO_2$ conversion | Dry syngas purity | $H_2/CO$ ratio | $(H_2 + CO)/CH_4$ |
|---|---|---|---|---|---|---|
| No | 0.74 | 25.63% | 44.1% | 35.09% | 0.31 | 0.63 |
| Yes | 0.74 | 79.3% | 99.5 | 92.29% | 1.1 | 2.5 |

For the data in Table 7, the pre-treatment was carried out in a reducing environment to achieve a metallic iron rich solid phase. These results have been shown to be stable for up to 60 hours of operation, which is evidence of the stability of the kinetic equilibrium and the solid metal oxide phase.

E. Parametric Studies of Exemplary Processes

Effects of gas hourly space velocity (GHSV) and operating pressure were evaluated for an experimental, fixed bed U-tube reactor. Results are discussed below.

Experiments were conducted evaluating the effect of gas hourly space velocity (GHSV) for an Ni-doped Fe oxide supported on $MgAl_2O_4$. The $CO_2:CH_4$ ratio was constant at 1.5 with the reaction conducted at 1000° C. and 1 atm. Table 8 shows the change in product composition with the increase in GHSV.

TABLE 8

Effects of GHSV on an Ni doped Fe oxide at $CO_2:CH_4 = 1.5$

| GHSV (min$^{-1}$) | $CH_4$ conversion | $CO_2$ conversion | Dry syngas purity | $H_2/CO$ ratio | $(H_2 + CO)/CH_4$ |
|---|---|---|---|---|---|
| 12.74 | 99.93 | 80.92 | 93.49 | 0.91 | 4.12 |
| 25.48 | 99.96 | 82.49 | 93.72 | 0.83 | 3.93 |
| 63.69 | 98.86 | 82.56 | 93.36 | 0.81 | 4.08 |

The example system does not show a strong correlation with GHSV, thus indicating the flexibility and improved turndown ratio for the example system.

To evaluate the effect of operating pressure, dual doped material was synthesized to attain higher $CO_2$ conversions at higher pressures. This metal oxide included Co and Ni doped in a Fe based oxide with $MgAl_2O_4$ support. This metal oxide was investigated at a temperature of 1000° C. and pressures of 1 and 5 atm at $CO_2$ to $CH_4$ ratio of 1.5. Between 1 and 5 atm, the GHSV at reaction conditions was kept the same by increasing the standard volumetric flow rate proportional to the increase in pressure. The experimental data for these runs has been depicted in Table 9. The efficiency of the example dual doped material is highlighted from a high syngas yield of 3.94 per mole of $CH_4$ at 5 atm.

TABLE 9

Effects of operating pressures on an example system at $CO_2:CH_4 = 1.5$

| Pressure (atm) | $CH_4$ conversion | $CO_2$ conversion | Dry syngas purity | $H_2/CO$ ratio | $(H_2 + CO)/CH_4$ |
|---|---|---|---|---|---|
| 1 | 99.84 | 83.89 | 93.99 | 0.78 | 3.8 |
| 5 | 95.68 | 80.90 | 92.28 | 0.77 | 3.94 |

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. For example, when a pressure range is described as being between ambient pressure and another pressure, a pressure that is ambient pressure is expressly contemplated.

We claim:

1. A method for operating a reactor system, the method comprising:
   providing an input stream to the reactor system, the input stream including a reducing gas stream and an oxidant stream;
   determining an initial oxygen content of a metal oxide in the reactor system;
   measuring an oxygen content of the input stream;
   measuring an oxygen content of an output stream from the reactor system;

calculating a percent oxygen depletion of the metal oxide using the initial oxygen content of the metal oxide, the oxygen content of the input stream, and the oxygen content of the output stream; and when the percent oxygen depletion of the metal oxide is above a predetermined threshold between 5% and 15%, adjusting a mole ratio of reducing gas to oxidant in the input stream.

2. The method according to claim 1, wherein the reducing gas stream includes natural gas.

3. The method according to claim 1, wherein the oxidant stream includes $H_2O$.

4. The method according to claim 3, wherein the oxidant stream includes $CO_2$.

5. The method according to claim 1, further comprising operating the reactor system at a steady state mole ratio of reducing gas to oxidant that is less than $10^6$ and more than $10^{-6}$.

6. The method according to claim 1, further comprising operating the reactor at a temperature 700° C. and 1100° C.

7. The method according to claim 6, wherein the temperature is between 800° C. and 1050° C.

8. The method according to claim 1, further comprising operating the reactor at a pressure between 0.1 atm and 80 atm.

9. The method according to claim 8, wherein the pressure is between 0.5 atm and 5 atm.

10. The method according to claim 1, wherein the metal oxide is of the form $Fe_xM_yO_z$.

11. The method according to claim 10, wherein M is titanium (Ti) or nickel (Ni).

12. The method according to claim 10, wherein M is nickel (Ni) and cobalt (Co).

13. The method according to claim 10, wherein the metal oxide is supported on $MgAl_2O_4$.

14. The method according to claim 1, wherein the metal oxide is in powder form.

15. The method according to claim 14, wherein the powder form has an average particle size between 150 μm and 250 μm.

16. The method according to claim 1, wherein the output stream includes CO and $H_2$.

17. A method for operating a reactor system, the method comprising:
    providing a first input stream to a first reactor assembly in the reactor system, the first input stream including reducing gas and oxidant;
    determining an initial oxygen content of a first metal oxide in the first reactor assembly;
    measuring a first input stream oxygen content;
    measuring an oxygen content of an output of the first reactor assembly;
    calculating a percent oxygen depletion of the first metal oxide using the initial oxygen content of the first metal oxide, the first input stream oxygen content, and the oxygen content of the output of the first reactor assembly;
    when the percent oxygen depletion of the first metal oxide is above a first predetermined threshold between 5% and 15%, adjusting a mole ratio of reducing gas to oxidant in the first input stream;
    providing a second input stream to a second reactor assembly in the reactor system, the second input stream including reducing gas and oxidant;
    determining an initial oxygen content of a second metal oxide in the second reactor assembly;
    measuring a second input stream oxygen content;
    measuring an oxygen content of an output of the second reactor assembly;
    calculating a percent oxygen depletion of the second metal oxide using the initial oxygen content of the second metal oxide, the second input stream oxygen content, and the oxygen content of the output stream; and
    when the percent oxygen depletion of the second metal oxide is above a second predetermined threshold between 5% and 15%, adjusting a mole ratio of reducing gas to oxidant in the second input stream.

18. The method according to claim 17, wherein the first reactor assembly includes at least two reactors, wherein the second reactor assembly includes at least two reactors, and further comprising:
    operating each reactor in the first reactor assembly to have a first target mole ratio of reducing gas to oxidant between $10^6$ and $10^{-6}$; and
    operating each reactor in the second reactor assembly to have a second target mole ratio of reducing gas to oxidant between $10^6$ and $10^{-6}$,
        wherein the first target mole ratio of reducing gas to oxidant is different from the second target mole ratio of reducing gas to oxidant.

19. The method according to claim 17, wherein the first input stream is in communication with a reducing gas source and an oxidant source; and
    wherein the first input stream includes at least one flow regulation device arranged to modify a ratio of flow from the reducing gas source and the oxidant source.

20. The method according to claim 17, wherein the first input stream is in communication with a first supply source and a second supply source, the first supply source having a first predetermined ratio of reducing gas to oxidant between 0.9 and 0.99; and
    the second supply source having a second predetermined ratio of reducing gas to oxidant between 0.9 and 0.99.

21. The method according to claim 17, further comprising:
    providing a third input stream to a third reactor assembly in the reactor system, the third input stream including reducing gas and oxidant;
    determining an initial oxygen content of a third metal oxide in the third reactor assembly;
    measuring a third input stream oxygen content;
    measuring an oxygen content of an output of the third reactor assembly;
    calculating a percent oxygen depletion of the third metal oxide using the initial oxygen content of the third metal oxide, the third input stream oxygen content, and the oxygen content of the output stream; and
    when the percent oxygen depletion of the third metal oxide is above a third predetermined threshold between 5% and 15%, adjusting a mole ratio of reducing gas to oxidant in the third input stream.

22. The method according to claim 21, wherein the third reactor assembly includes at least two reactors, and further comprising:
    operating each reactor in the third reactor assembly to have a third target mole ratio between $10^6$ and $10^{-6}$ of reducing gas to oxidant,
wherein the third target mole ratio of reducing gas to oxidant is different from both the first and the second target mole ratios of reducing gas to oxidant.

* * * * *